(12) United States Patent
Asoma

(10) Patent No.: US 11,089,230 B2
(45) Date of Patent: Aug. 10, 2021

(54) CAPTURING APPARATUS, CAPTURING MODULE, CAPTURING SYSTEM, AND CAPTURING APPARATUS CONTROL METHOD

(71) Applicant: SONY SEMICONDUCTOR SOLUTIONS CORPORATION, Kanagawa (JP)

(72) Inventor: Akira Asoma, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/491,261

(22) PCT Filed: Dec. 20, 2017

(86) PCT No.: PCT/JP2017/045694
§ 371 (c)(1),
(2) Date: Sep. 5, 2019

(87) PCT Pub. No.: WO2018/179623
PCT Pub. Date: Oct. 4, 2018

(65) Prior Publication Data
US 2020/0036881 A1  Jan. 30, 2020

(30) Foreign Application Priority Data
Mar. 30, 2017  (JP) .............................. JP2017-067103

(51) Int. Cl.
*H04N 5/235* (2006.01)
*H04N 13/25* (2018.01)
(Continued)

(52) U.S. Cl.
CPC ......... *H04N 5/2352* (2013.01); *H04N 5/2258* (2013.01); *H04N 13/25* (2018.05)

(58) Field of Classification Search
CPC ............... H04N 5/2352; H04N 5/2258; H04N 9/04551; H04N 5/232; H04N 5/2353;
(Continued)

(56) References Cited

U.S. PATENT DOCUMENTS

2007/0188650 A1 * 8/2007 Kobayashi ......... H04N 5/23296
348/344
2009/0015689 A1 * 1/2009 Murayama ........... H04N 13/257
348/229.1
(Continued)

FOREIGN PATENT DOCUMENTS

JP      2011-071605 A   4/2011
JP      2012-065204 A   3/2012
(Continued)

OTHER PUBLICATIONS

International Search Report and Written Opinion of PCT Application No. PCT/JP2017/045694, dated Feb. 6, 2018, 10 pages of ISRWO.

*Primary Examiner* — Albert H Cutler
(74) *Attorney, Agent, or Firm* — Chip Law Group

(57) ABSTRACT

A compound-eye capturing apparatus provided with a plurality of imaging devices captures a plurality of items of image data with the same image quality. First pixels for generating first pixel signals are arranged in a first pixel array part. Second pixels for generating second pixel signals are arranged in a second pixel array part. A first setting part sets an exposure time and a first gain for the first pixel signals on the basis of an appropriate exposure value. A second setting part adjusts the first gain on the basis of a difference in sensitivity between a first monocular camera module provided with the first pixel array part and a second monocular camera module provided with the second pixel array part, and sets the adjusted first gain as a second gain for the second pixel signals. A control part causes the first
(Continued)

and second pixel array parts to be exposed over the exposure time. An amplification part amplifies the output first and second pixel signals by the first and second gains.

10 Claims, 27 Drawing Sheets

(51) Int. Cl.
| | | |
|---|---|---|
| H04N 5/225 | (2006.01) | |
| H04N 9/04 | (2006.01) | |
| H04N 5/232 | (2006.01) | |
| H04N 13/239 | (2018.01) | |
| H04N 13/296 | (2018.01) | |
| H04N 5/243 | (2006.01) | |
| G03B 7/091 | (2021.01) | |
| G03B 15/00 | (2021.01) | |
| G03B 19/07 | (2021.01) | |

(58) Field of Classification Search
CPC ........... H04N 13/296; H04N 2213/001; H04N 13/239; H04N 5/2257; H04N 5/243; G03B 7/091; G03B 15/00; G03B 19/07
See application file for complete search history.

(56) References Cited

U.S. PATENT DOCUMENTS

| | | | |
|---|---|---|---|
| 2011/0012997 A1* | 1/2011 | Koguchi | H04N 13/133 |
| | | | 348/47 |
| 2011/0069156 A1 | 3/2011 | Kurahashi | |
| 2013/0041226 A1* | 2/2013 | McDowall | G02B 23/04 |
| | | | 600/166 |
| 2013/0057745 A1 | 3/2013 | Yoshida | |
| 2014/0140617 A1* | 5/2014 | Shigeta | H04N 5/232 |
| | | | 382/167 |
| 2015/0278996 A1 | 10/2015 | Tsutsumi | |
| 2015/0334373 A1* | 11/2015 | Kubota | H04N 13/239 |
| | | | 348/49 |
| 2017/0272644 A1* | 9/2017 | Chou | H04N 5/2352 |
| 2017/0318273 A1* | 11/2017 | Mantzel | H04N 9/093 |
| 2018/0213141 A1* | 7/2018 | Pandit | H04N 5/2256 |

FOREIGN PATENT DOCUMENTS

| | | |
|---|---|---|
| JP | 2013-055495 A | 3/2013 |
| JP | 102984461 A | 3/2013 |
| JP | 2015-197745 A | 11/2015 |

* cited by examiner

CAPTURING APPARATUS, CAPTURING MODULE, CAPTURING SYSTEM, AND CAPTURING APPARATUS CONTROL METHOD

CROSS REFERENCE TO RELATED APPLICATIONS

This application is a U.S. National Phase of International Patent Application No. PCT/JP2017/045694 filed on Dec. 20, 2017, which claims priority benefit of Japanese Patent Application No. JP 2017-067103 filed in the Japan Patent Office on Mar. 30, 2017. Each of the above-referenced applications is hereby incorporated herein by reference in its entirety.

TECHNICAL FIELD

The present technology relates to a capturing apparatus, a capturing module, a capturing system, and a capturing apparatus control method. Specifically, the present technology relates to a compound-eye capturing apparatus provided with a plurality of imaging devices, a capturing module, a capturing system, and a capturing apparatus control method.

BACKGROUND ART

A compound-eye capturing apparatus provided with a plurality of imaging devices has been conventionally used in order to capture a plurality of items of image data at the same time. For example, there has been proposed a binocular capturing apparatus for capturing two items of captured data at the same time by use of the same analog gain and shutter speed by two imaging devices (see Patent Document 1, for example).

CITATION LIST

Patent Document

Patent Document 1: Japanese Patent Application Laid-Open No. 2006-295506

SUMMARY OF THE INVENTION

Problems to be Solved by the Invention

With the above-described conventional technology, in a case where the pixel sensitivities of two imaging devices are the same, two items of image data with the same quality can be captured under the same capturing condition. However, in a case where the pixel sensitivities of the respective imaging devices are different due to a difference in optical condition such as the presence of a color filter, or a variation in products, the brightness of the two items of image data cannot be the same. Further, also in a case where not only the sensitivities but also the F-values of the two respective optical systems are different, the brightness cannot be the same. The brightness can be matched by changing one shutter speed even in a case where the pixel sensitivities or F-values of both the optical systems are different, but in this case, images with different degrees of blur of a moving object are obtained due to a difference in shutter speed. As described above, in a case where the sensitivities of the two respective imaging devices or the optical characteristics of the respective optical systems are different, there is a problem in which two items of image data with the same image quality are difficult to capture.

The present technology has been made in terms of such a situation, and is directed for capturing a plurality of items of image data with the same image quality in a compound-eye capturing apparatus provided with a plurality of imaging devices.

Solutions to Problems

The present technology has been made in order to solve the above problem, and a first aspect thereof is a capturing apparatus and a method for controlling the same, the capturing apparatus including a first pixel array part in which first pixels for generating first pixel signals are arranged, a second pixel array part in which second pixels for generating second pixel signals are arranged, a first setting part configured to set an exposure time and a first gain for the first pixel signals on the basis of an appropriate exposure value, a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels, a control part configured to cause the first and second pixel array parts to be exposed over the exposure time, and an amplification part configured to amplify the output first and second pixel signals by the first and second gains. Thereby, there is caused an effect that the pixel signals are amplified by the gain adjusted on the basis of the difference in sensitivity between the first and second monocular camera modules.

Further, according to the first aspect, the appropriate exposure value may include a first appropriate exposure value calculated from the first pixel signals and a second appropriate exposure value calculated from the second pixel signals, the first setting part may set the exposure time and the first gain on the basis of the first appropriate exposure value, and the second setting part may calculate the second gain from the first appropriate exposure value, the difference in sensitivity, and the exposure time. Thereby, there is caused an effect that the second pixel signals are amplified by the second gain calculated from the first appropriate exposure value, the difference in sensitivity, and the exposure time.

Further, according to the first aspect, in a case where a gain calculated from the first appropriate exposure value, the difference in sensitivity, and the exposure time takes a negative value, the second setting part may acquire a new exposure time from the calculated gain and the exposure time, and set the second gain at zero, and when acquiring the new exposure time, the first setting part may set again calculated from the new exposure time and the first appropriate exposure value as the first gain. Thereby, there is caused an effect that in a case where the gain has a negative value, a new exposure time is acquired from the gain and the exposure time.

Further, according to the first aspect, the second setting part may include a calculator configured to calculate a reference exposure value from the first appropriate exposure value and a sensitivity difference converted value obtained by converting the difference in sensitivity to an exposure value, a correction part configured to correct the second appropriate exposure value and output it as a corrected appropriate exposure value on the basis of the reference exposure value, and a gain calculation part configured to calculate the second gain from a difference between the corrected appropriate exposure value and a value obtained by converting the exposure time to an exposure value. Thereby, there is caused an effect that the second gain is calculated on the basis of the difference between the first appropriate exposure value and the sensitivity difference converted value.

Further, according to the first aspect, the correction part may correct the second appropriate exposure value to a value within a predetermined permitted range including the reference exposure value. Thereby, there is caused an effect that the second gain is calculated by the appropriate exposure value corrected within the permitted range.

Further, according to the first aspect, the correction part may correct a value obtained by weighting and adding the reference exposure value and the second appropriate exposure value to a value within a predetermined permitted range including the reference exposure value. Thereby, there is caused an effect that the weighted addition value is corrected to a value within the permitted range.

Further, according to the first aspect, the first pixels may include a plurality of pixels configured to receive pieces of light with mutually different wavelengths, and the second pixels may receive pieces of light with the same wavelength, respectively. Thereby, there is caused an effect that monochrome image data and color image data are captured.

Further, according to the first aspect, there are further provided a first capturing lens configured to condense and guide a light to the first pixel array part, and a second capturing lens configured to condense and guide a light to the second pixel array part, in which the first capturing lens may have a different angle of field from that of the second capturing lens. Thereby, there is caused an effect that two items of image data with different angles of field are captured.

Further, according to the first aspect, there is further provided an AD conversion part configured to convert the first and second pixel signals to first and second pixel data, the first gain may include a first analog gain and a first digital gain, the second gain may include a second analog gain and a second digital gain, and the amplification part may include an analog signal amplification part configured to amplify the first and second pixel signals by first and second analog gains, and a digital signal amplification part configured to amplify the first and second pixel data by first and second digital gains. Thereby, there is caused an effect that pixel data obtained by AD converting the pixel signals amplified by the analog gain is amplified by the digital gain.

Further, a second aspect of the present technology is a capturing module including a first pixel array part in which first pixels for generating first pixel signals are arranged, a second pixel array part in which second pixels for generating second pixel signals are arranged, a first setting part configured to set an exposure time and a first gain for the first pixel signals on the basis of an appropriate exposure value, a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels, a control part configured to cause the first and second pixel array parts to be exposed over the exposure time, an amplification part configured to amplify the output first and second pixel signals by the first and second gains, and an image output part configured to output image data generated from the first and second pixel signals. Thereby, there is caused an effect that the image data generated from the image signal amplified by the gain adjusted on the basis of the difference in sensitivity between the first and second monocular camera modules is output.

Further, a third aspect of the present technology is a capturing system including a first pixel array part in which first pixels for generating first pixel signals are arranged, a second pixel array part in which second pixels for generating second pixel signals are arranged, a first setting part configured to set an exposure time and a first gain for the first pixel signals on the basis of an appropriate exposure value, a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels, a control part configured to cause the first and second pixel array parts to be exposed over the exposure time, an amplification part configured to amplify the output first and second pixel signals by the first and second gains, and a recording part configured to record image data generated from the first and second pixel signals. Thereby, there is caused an effect that the image data generated from the image signal amplified by the gain adjusted on the basis of the difference in sensitivity between the first and second monocular camera modules is recorded.

Effects of the Invention

According to the present technology, a compound-eye capturing apparatus provided with a plurality of imaging devices can have an excellent effect that a plurality of items of image with the same image quality can be captured. Additionally, the effect described herein is not necessarily limited, and may be any effect described in the present disclosure.

MODE FOR CARRYING OUT THE INVENTION

Modes for carrying out the present technology (denoted as embodiments below) will be described below. The description will be made in the following order.

1. First embodiment (example of adjusting gain based on difference in sensitivity)

2. Second embodiment (example of switching between main side and sub side and adjusting gain based on difference in sensitivity)

3. Third embodiment (example of adjusting gain based on difference in sensitivity and capturing two color images)

4. Fourth embodiment (example of adjusting gain based on difference in sensitivity in capturing system with three or more lenses)

5. Application to moving object

1. First Embodiment

[Exemplary Configuration of Capturing Apparatus]

Figure 1:
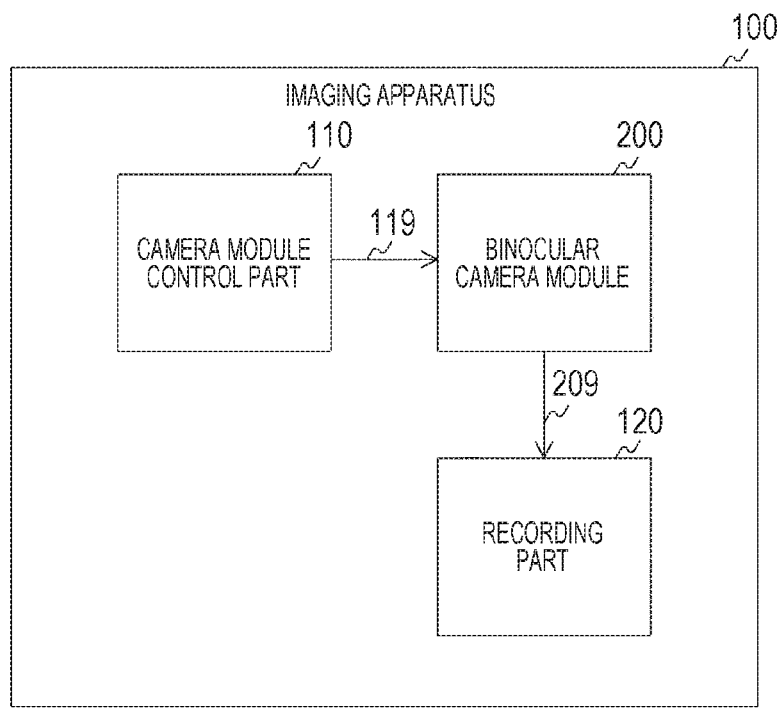
FIG. 1 is a block diagram illustrating an exemplary configuration of a capturing apparatus according to a first embodiment of the present technology.

FIG. 1 is a block diagram illustrating an exemplary configuration of a capturing apparatus 100 according to a first embodiment of the present technology. The capturing apparatus 100 can capture image data, and includes a camera module control part 110, a binocular camera module 200, and a recording part 120. A general-purpose device such as Smartphone or personal computer having a capturing function, or a digital camera such as digital still camera or digital video camera is assumed for the capturing apparatus 100.

The camera module control part 110 is directed for controlling the binocular camera module 200 in response to a user operation. For example, the camera module control part 110 generates a control signal for instructing to start or stop capturing, and supplies it to the binocular camera module 200 via a signal line 119 in response to a user operation.

The binocular camera module 200 is directed for capturing two items of image data by two solid state imaging devices at the same time. The binocular camera module 200 supplies the captured image data to the recording part 120 via a signal line 209. The recording part 120 is directed for recording image data. Additionally, the binocular camera module 200 is an exemplary capturing module described in CLAIMS.

[Exemplary Configuration of Binocular Camera Module]

Figure 2A:
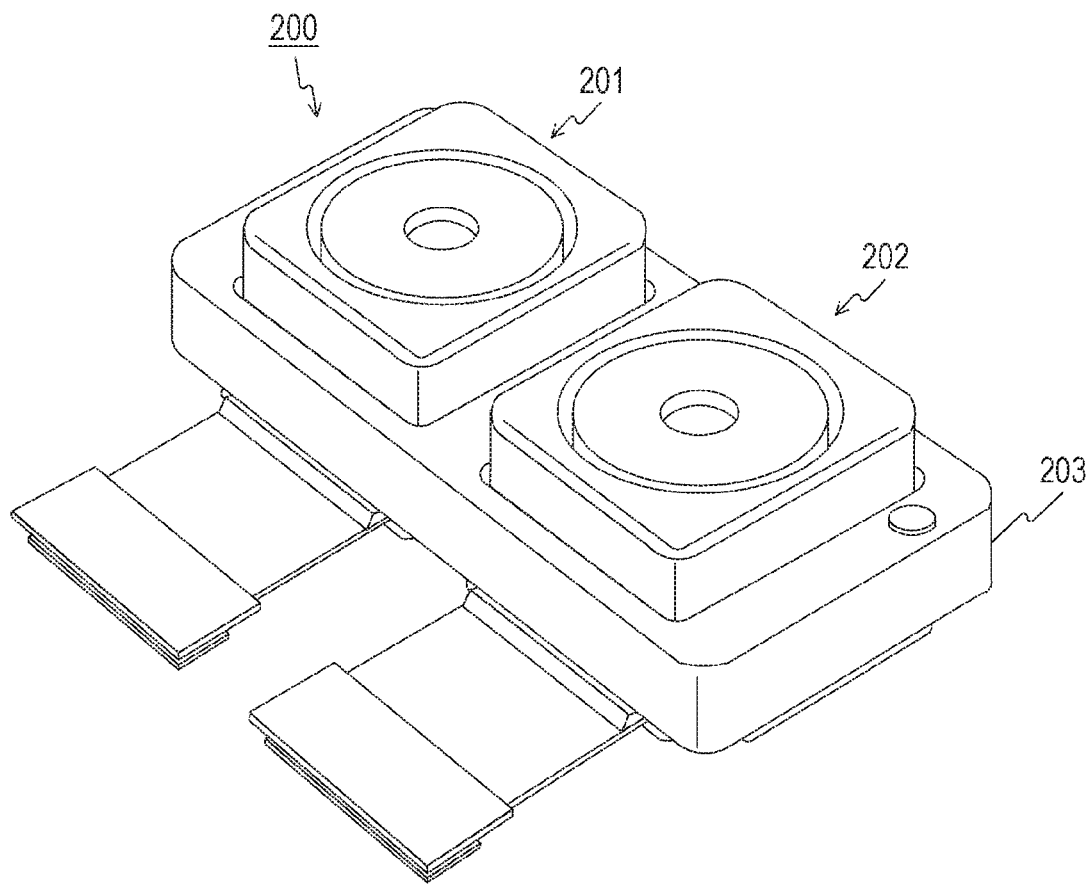
FIGS. 2A and 2B are diagrams illustrating exemplary appearance configurations of a binocular camera module according to the first embodiment of the present technology.
Figure 2B:
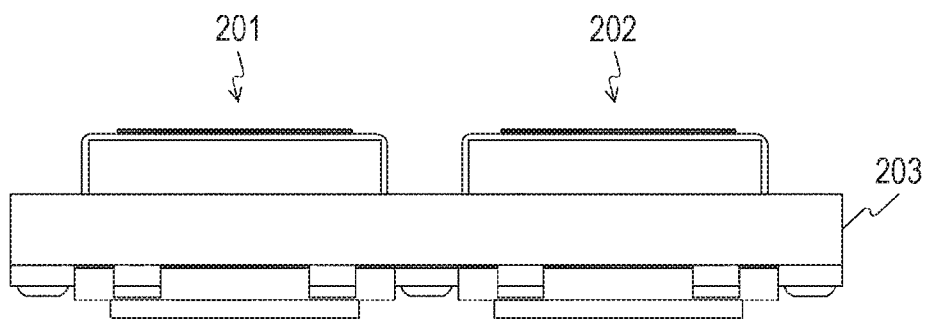

FIGS. 2A and 2B are diagrams illustrating exemplary appearance configurations of the binocular camera module according to the first embodiment of the present technology, respectively. In of FIG. 2A, a perspective view of the binocular camera module 200 is illustrated, and in FIG. 2B, a front view of the binocular camera module 200 is illustrated.

The binocular camera module 200 is a compound-eye camera module, and is configured such that a monocular camera module 201 and a monocular camera module 202 are fixed via a coupling member 203 in a rectangular plate shape.

The monocular camera module 201 mounts thereon a solid state imaging device such as complementary metal oxide semiconductor (CMOS) image sensor, a lens unit, or the like.

A solid state imaging device in the monocular camera module 201 is configured of a pixel part in which a plurality of pixels is arranged in a 2D shape, a peripheral circuit part for, for example, driving or analog/digital (A/D) converting the pixels, and the like. In the solid state imaging device, a light (image light) incident from a lens in the lens unit is formed into an image on a light receiving face of the pixel part and a light of the formed image is photoelectrically converted thereby to generate an image signal.

The monocular camera module 202 mounts thereon a CMOS image sensor, a lens unit, or the like similarly to the monocular camera module 201. For example, the monocular camera module 202 can be assumed to be a main camera and the monocular camera module 201 can be assumed to be a sub camera in the binocular camera module 200.

The coupling member 203 is in a rectangular plate shape with a larger contour than the horizontal size when the lens unit and the monocular camera module 201 and the lens unit of the monocular camera module 202 are arranged. Further, a rectangular insertion hole part into which the lens unit of the monocular camera module 201 is inserted, and a rectangular insertion hole part into which the lens unit of the monocular camera module 202 is inserted are symmetrically penetrated and formed in the coupling member 203.

The lens unit of the monocular camera module 201 and the lens unit of the monocular camera module 202 are inserted and fixed in the two rectangular insertion hole parts penetrated and formed in the coupling member 203, respectively, in the binocular camera module 200. Thereby, the binocular camera module 200 is configured as a compound-eye camera module including the monocular camera module 201 and the monocular camera module 202. The binocular camera module 200 is configured as described above.

Additionally, the monocular camera module 201 and the monocular camera module 202 are a plurality of exemplary monocular camera modules which is coupled via the coupling member 203, and in a case where they do not need to be particularly discriminated, they will be simply denoted as monocular camera module 201 for description.

Further, a monocular camera module mounts one solid state imaging device (image sensor) thereon. On the other hand, a binocular camera module is a camera module in which two monocular camera modules are coupled and on which two solid state imaging devices (image sensors) are mounted. However, a module may be denoted with other name such as package.

Figure 3:
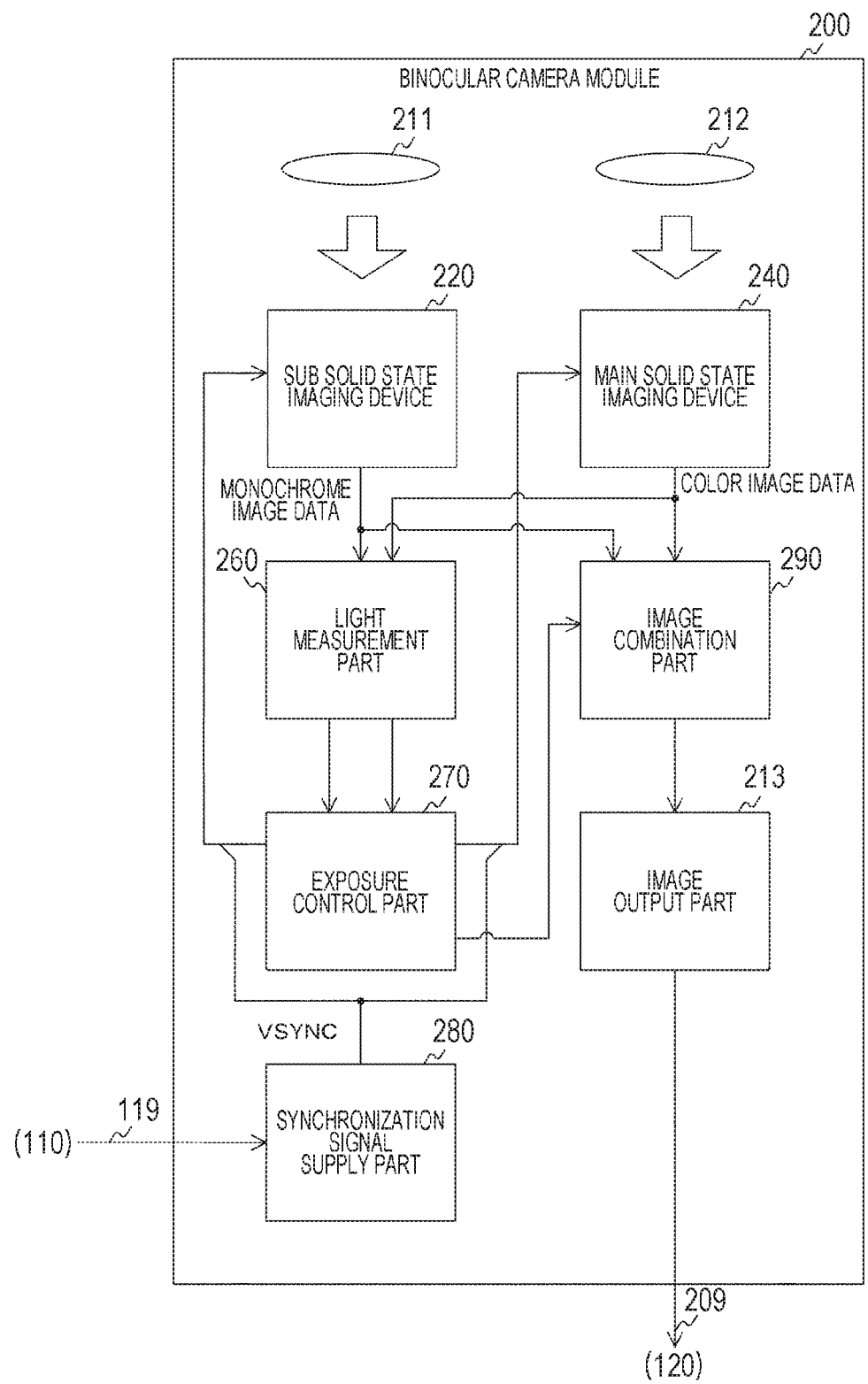
FIG. 3 is a block diagram illustrating an exemplary configuration of the binocular camera module according to the first embodiment of the present technology.

FIG. 3 is a block diagram illustrating an exemplary configuration of the binocular camera module 200 according to the first embodiment of the present technology. The binocular camera module 200 includes capturing lenses 211 and 212, a sub solid state imaging device 220, a main solid state imaging device 240, a light measurement part 260, an exposure control part 270, a synchronization signal supply part 280, an image combination part 290, and an image output part 213.

The capturing lens 211 and the sub solid state imaging device 220 in FIG. 3 are arranged in the monocular camera module 201 in FIGS. 2A and 2B, and the capturing lens 212 and the main solid state imaging device 240 in FIG. 3 are arranged in the monocular camera module 202 in FIGS. 2A and 2B. Further, a main circuit and a sub circuit in the light measurement part 260 in FIG. 3 are dispersed and arranged in the monocular camera modules 202 and 201 in FIGS. 2A and 2B, respectively. The exposure control part 270, the synchronization signal supply part 280, the image combination part 290, and the image output part 213 in FIG. 3 may be arranged in either the monocular camera module 201 or 202 in FIGS. 2A and 2B.

The capturing lens 211 is directed for condensing a light from an object and guiding it to the sub solid state imaging device 220. The capturing lens 212 is directed for condensing a light from an object and guiding it to the main solid state imaging device 240. The F values of the diaphragms of the respective capturing lenses 211 and 212 are fixed values, for example. Additionally, there may be configured such that the F values are variable and are controlled by the exposure control part 270. In a case where the F values are variable, the F values are controlled at appropriate values in the main side and in the sub side in consideration of the respective angles of field and depths of field in the main side and the sub side.

The sub solid state imaging device 220 is directed for capturing image data. The sub solid state imaging device 220 captures monochrome image data configured of pixel data not including color information. The sub solid state imaging device 220 then supplies the monochrome image data to the light measurement part 260 and the image combination part 290.

The main solid state imaging device 240 is directed for capturing image data. The main solid state imaging device 240 captures color image data configured of pixel data including color information. The color image data is such that pixel data of R (Red), G (Green), and B (Blue) are arranged in the Bayer layout, and is also called RAW image data. Further, the total number of pixels of the color image data is assumed to be the same as that of the monochrome image data. The main solid state imaging device 240 supplies the color image data to the light measurement part 260 and the image combination part 290.

The light measurement part 260 is directed for measuring the amount of light by, for example, integration or weighted average of luminance values of the image data. The light measurement part 260 measures the amount of light in the sub side as the amount of sub measured light by use of the monochrome image data, and measures the amount of light in the main side as the amount of main measured light by use of the color image data. The light measurement part 260 then supplies the amount of sub measured light and the amount of main measured light to the exposure control part 270.

The exposure control part 270 is directed for performing exposure control on the basis of the amounts of measured light from the light measurement part 260. The exposure control part 270 calculates an appropriate exposure value from the amounts of measured light, and finds an exposure time (or shutter speed) and a gain for pixel signals on the basis of the appropriate exposure value. A micro-processing unit (MPU) executes a program so that the function of the exposure control part 270 can be realized.

Here, the gain includes at least one of an analog gain for an analog pixel signal and a digital gain for digital pixel data. Further, the digital gain includes at least one of a digital gain used inside the sub solid state imaging device 220 and the main solid state imaging device 240, and a digital gain used outside them. In the following, the sub analog gain is assumed to be SAG, and the main analog gain is assumed to be MAG. Further, the digital gain inside the sub solid state imaging device 220 is assumed to be SDG_IMG, and the sub digital gain used in the image combination part 290 is assumed to be SDG_DSP. The digital gain inside the main solid state imaging device 240 is assumed to be MDG_IMG, and the main digital gain used in the image combination part 290 is assumed to be MDG_DSP.

The exposure control part 270 supplies the respective setting values of the analog gain SAG and the digital gain SDG_IMG as well as the exposure time to the sub solid state imaging device 220. Further, the exposure control part 270 supplies the respective setting values of the analog gain MAG and the digital gain MDG_IMG as well as the exposure time to the main solid state imaging device 240. The exposure control part 270 then supplies the digital gains SDG_DSP and MDG_DSP to the image combination part 290.

The synchronization signal supply part 280 is directed for generating a vertical synchronization signal VSYNC with a predetermined frequency (60 Hz, for example) according to a module control signal. The synchronization signal supply part 280 supplies the generated vertical synchronization signal VSYNC to the sub solid state imaging device 220 and the main solid state imaging device 240.

The image combination part 290 is directed for combining the monochrome image data and the color image data. The color image data in the Bayer layout needs to be interpolated in a demosaic processing, and the resolution of G is at ½ of the total number of pixels and the resolutions of R and B are at ¼ of the total number of pixels due to the processing. On the other hand, the monochrome image data does not need the demosaic processing, and thus the resolution thereof is higher than that of the demosaic color image. Thus, the monochrome image data is combined thereby to compensate for pixel information lacking in the color image data, thereby further enhancing the image quality of the combined image data than not combined. The image combination part supplies the combined image data to the image output part 213.

The image output part 213 is directed for outputting the combined image data to the recording part 120. A circuit for transmitting data according to an internal interface standard such as DisplayPort is used for the image output part 213.

[Exemplary Configuration of Sub Solid State Imaging Device]

Figure 4:
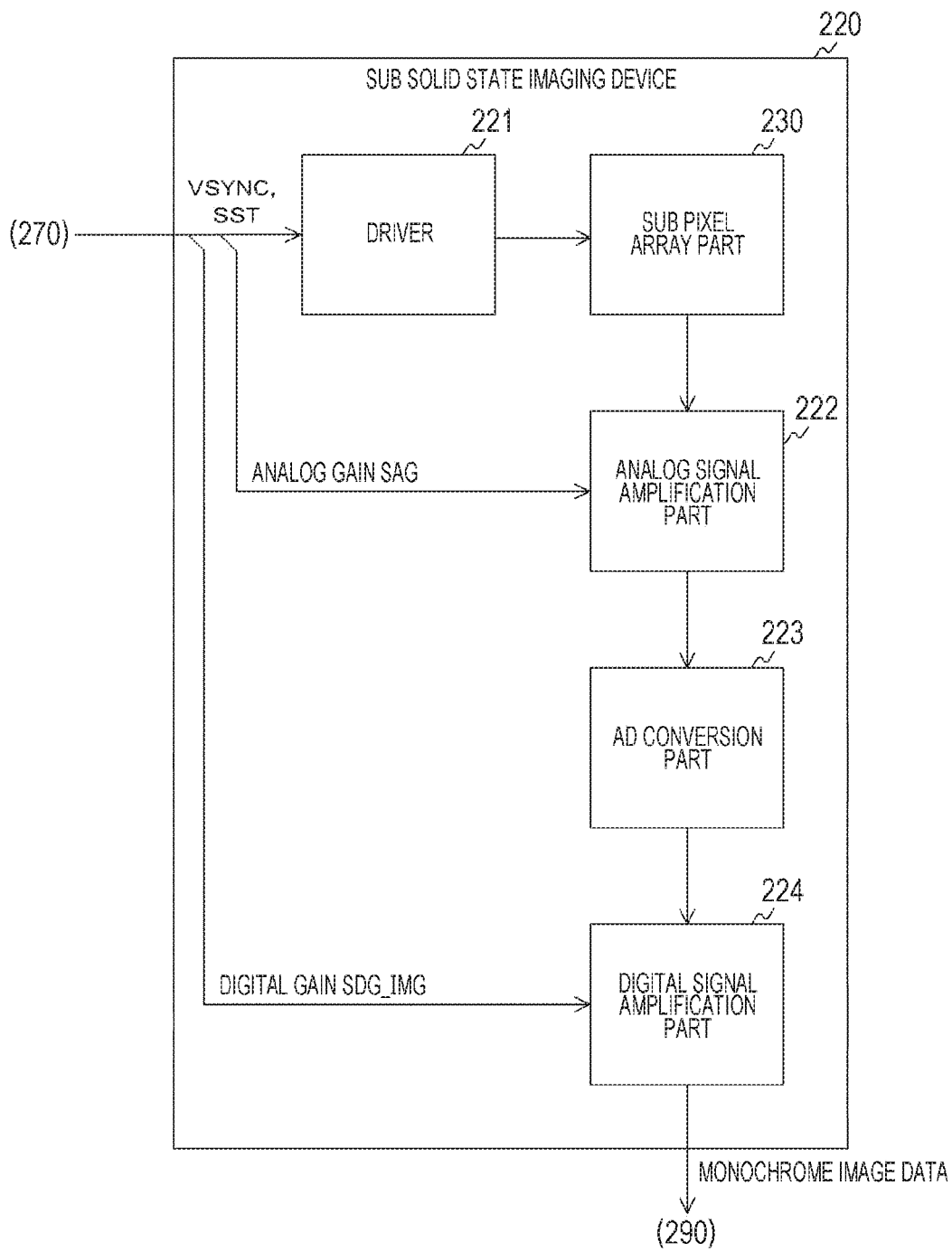
FIG. 4 is a block diagram illustrating an exemplary configuration of a sub solid state imaging device according to the first embodiment of the present technology.

FIG. 4 is a block diagram illustrating an exemplary configuration of the sub solid state imaging device 220 according to the first embodiment of the present technology. The sub solid state imaging device 220 includes a driver 221, a sub pixel array part 230, an analog signal amplification part 222, an analog to digital (AD) conversion part 223, and a digital signal amplification part 224.

The driver 221 is directed for scanning the sub pixel array part 230. A timing signal synchronized with the vertical synchronization signal VSYNC, and a sub exposure time are input into the driver 221. The driver 221 sequentially selects the lines in the sub pixel array part 230 in synchronization with the timing signal, and causes the lines to be exposed over the sub exposure time.

A plurality of pixels is arranged in a 2D matrix shape in the sub pixel array part 230. Each of the pixels generates an analog pixel signal and supplies it to the analog signal amplification part 222 under control of the driver 221. Additionally, the sub pixel array part 230 is an exemplary second pixel array part described in CLAIMS.

The analog signal amplification part 222 is directed for amplifying the pixel signals. The analog gain SAG is input into the analog signal amplification part 222. The analog signal amplification part 222 amplifies the pixel signals from the sub pixel array part 230 by the analog gain SAG and supplies them to the AD conversion part 223.

The AD conversion part 223 is directed for converting each of the analog pixel signals to digital pixel data. The AD conversion part 223 supplies each pixel data to the digital signal amplification part 224.

The digital signal amplification part 224 is directed for amplifying the pixel data. The digital gain SDG_IMG is input into the digital signal amplification part 224. The digital signal amplification part 224 amplifies the pixel data by the digital gain SDG_IMG, and outputs the amplified pixel data to the light measurement part 260 and the image combination part 290.

Additionally, the sub solid state imaging device 220 performs a signal processing such as correlated double sampling (CDS) processing as needed in addition to the above amplification processing and AD conversion, thereby generating monochrome image data.

[Exemplary Configuration of Main Solid State Imaging Device]

Figure 5:
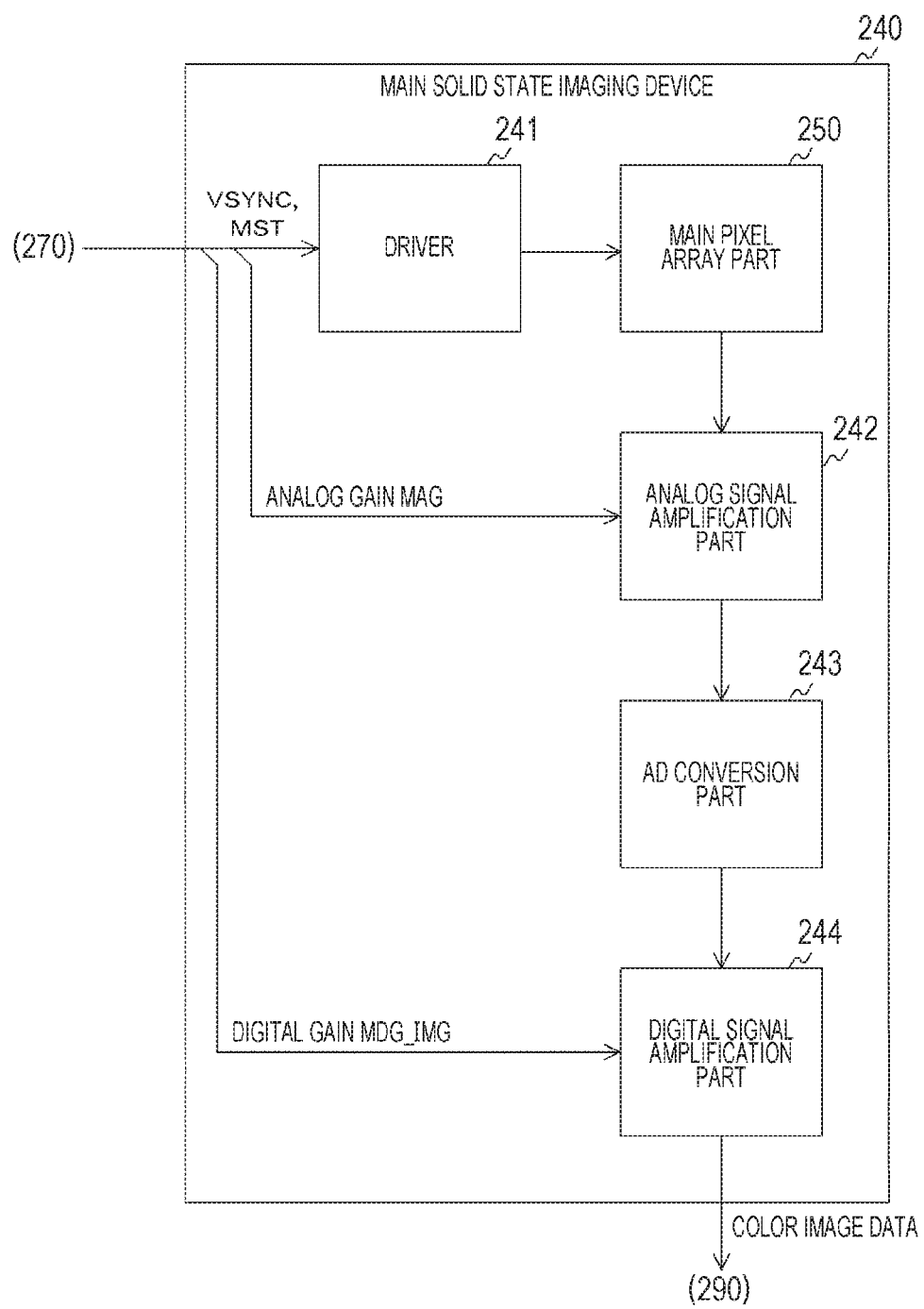
FIG. 5 is a block diagram illustrating an exemplary configuration of a main solid state imaging device according to the first embodiment of the present technology.

FIG. 5 is a block diagram illustrating an exemplary configuration of the main solid state imaging device 240 according to the first embodiment of the present technology. The main solid state imaging device 240 includes a driver 241, a main pixel array part 250, an analog signal amplification part 242, an AD conversion part 243, and a digital signal amplification part 244.

The driver 241 has a similar configuration to the sub driver 221 except using a main exposure time. R, G, and B pixels are provided in the Bayer layout in the main pixel array part 250. The analog signal amplification part 242 has a similar configuration to the sub analog signal amplification part 222 except amplification by the analog gain MAG. The digital signal amplification part 244 has a similar configuration to the sub digital signal amplification part 224 except amplification by the digital gain MDG_IMG. Additionally, the main pixel array part 250 is an exemplary first pixel array part described in CLAIMS.

[Exemplary Configuration of Pixel Array Part]

Figure 6A:
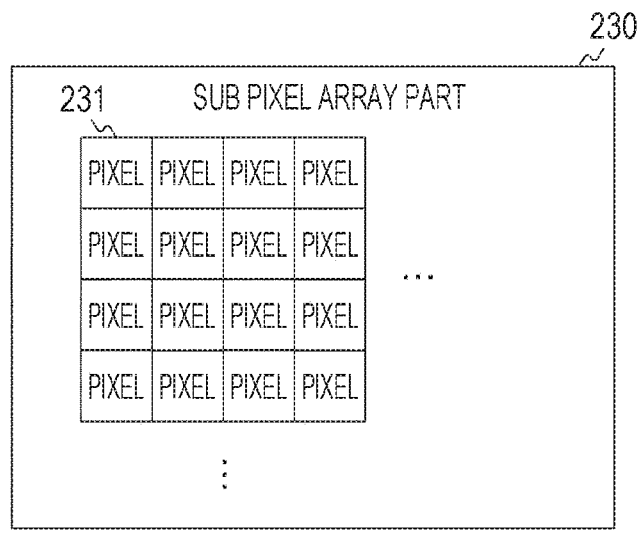
FIGS. 6A and 6B are exemplary plan views of a sub pixel array part and a main pixel array part according to the first embodiment of the present technology.
Figure 6B:
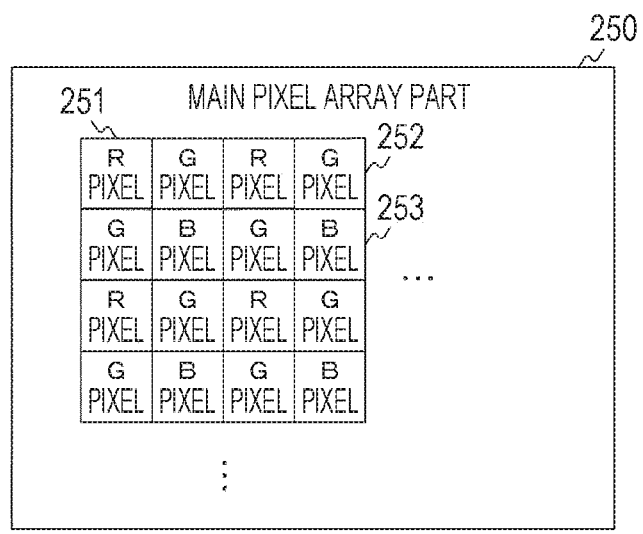

FIGS. 6A and 6B are exemplary plan views of the sub pixel array part 230 and the main pixel array part 250 according to the first embodiment of the present technology, respectively. In FIG. 6A, an exemplary plan view of the sub pixel array part 230 is illustrated, and in FIG. 6B, an exemplary plan view of the main pixel array part 250 is illustrated.

A plurality of pixels 231 is arranged in a 2D matrix shape in the sub pixel array part 230. Then, each of the pixels 231 is not provided with a color filter. Thus, monochrome image data not including color information is captured by the sub pixel array part 230.

On the other hand, predetermined numbers of R pixels 251, G pixels 252, and B pixels 253 are arranged in the Bayer layout in a 2D matrix shape in the main pixel array part 250. The total number of pixels in the main pixel array part 250 is the same as that in the sub pixel array part 230. An R pixel 251 is provided with a color filter for transmitting a red light, and a G pixel 252 is provided with a color filter for transmitting a green light. Further, a B pixel 253 is provided with a color filter for transmitting a blue light. The transmissivities of the color filters are less than 100%, and thus the optical sensitivities of the R pixels 251, the G pixels 252, and the B pixels 253, which each have a color filter, are lower than that of the pixels 231.

The pixel sensitivities are different between the main side and the sub side, and thus the total sensitivities of the respective main and sub monocular camera modules are different. Further, in a case where the optical characteristics (such as F value) of the respective main and sub optical systems are different, the difference in characteristic influences the difference in sensitivity of the monocular camera modules.

[Exemplary Configuration of Exposure Control Part]

Figure 7:
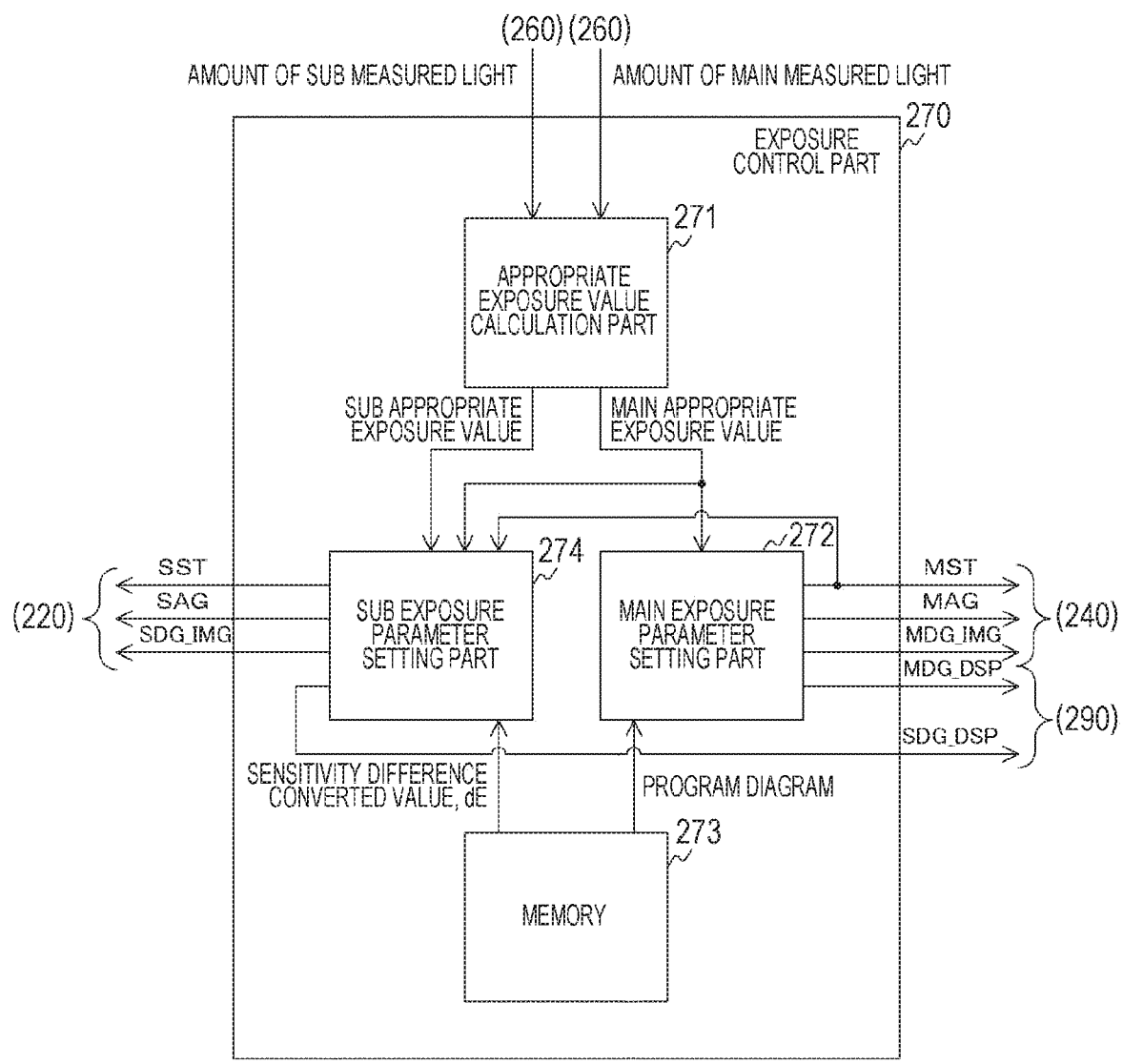
FIG. 7 is a block diagram illustrating an exemplary configuration of an exposure control part according to the first embodiment of the present technology.

FIG. 7 is a block diagram illustrating an exemplary configuration of the exposure control part 270 according to the first embodiment of the present technology. The exposure control part 270 includes an appropriate exposure value calculation part 271, a main exposure parameter setting part 272, a memory 273, and a sub exposure parameter setting part 274.

The appropriate exposure value calculation part 271 is directed for calculating an appropriate exposure value of each of the main side and the sub side from the amount of main measured light and the amount of sub measured light. The appropriate exposure value calculation part 271 inputs the amount of main measured light into a predetermined function thereby to calculate the main appropriate exposure value. Further, the appropriate exposure value calculation part 271 inputs the amount of sub measured light into the function thereby to calculate the sub appropriate exposure value.

Here, an "appropriate exposure value" means an exposure value required for setting image data at desired brightness. Then, the exposure value is generally determined by F value, exposure time, and gain. Here, the F value is fixed as described above, and thus the appropriate exposure value calculation part 271 assumes a value obtained by converting the fixed F value into an exposure value to be as offset, and subtracts the offset from the main appropriate exposure value and the sub appropriate exposure value.

The appropriate exposure value calculation part 271 supplies the offset-subtracted main appropriate exposure value to the main exposure parameter setting part 272 and the sub exposure parameter setting part 274, and supplies the offset-subtracted sub appropriate exposure value to the sub exposure parameter setting part 274.

The main exposure parameter setting part 272 is directed for setting the main exposure time and gain. The main exposure parameter setting part 272 finds the main exposure time and gain from the main appropriate exposure value with reference to a program diagram. The gain includes at least one of the analog gain MAG and the digital gains MDG_IMG and MDG_DSP. The analog gain MAG among them is preferentially set, for example. In a case where the required gain is reached only by the analog gain MAG, only the analog gain MAG is set at a significant value. In other words, the analog gain MAG is set at a higher value than "0" dB, and the digital gains are set at "0" dB. Further, in a case where only the analog gain MAG is lacking for the gain, the digital gain MDG_IMG or MDG_DSP is further set.

The main exposure parameter setting part 272 supplies the main exposure time to the sub exposure parameter setting part 274 and the main solid state imaging device 240. Further, the main exposure parameter setting part 272 supplies the analog gain MAG and the digital gain MDG_IMG to the main solid state imaging device 240, and supplies the digital gain MDG_DSP to the image combination part 290. Additionally, the main exposure parameter setting part 272 is an exemplary first setting part described in CLAIMS.

The sub exposure parameter setting part 274 is directed for setting the sub exposure time and gain. The sub exposure parameter setting part 274 sets the same value as the main exposure time for the sub exposure time. Further, the sub exposure parameter setting part 274 calculates a reference exposure value in the following Equation.

$$SEB = ME - D \quad \text{Equation 1}$$

In the above Equation, SEB indicates the reference exposure value. ME indicates the main appropriate exposure value, and D indicates a value obtained by converting a difference in sensitivity between the monocular camera module 201 and the monocular camera module 202 into an exposure value.

The sub exposure parameter setting part 274 then sets the reference exposure value SEB±dE as a permitted range, and a sub appropriate exposure value SE1 is corrected to a value within the permitted range to be a corrected sub appropriate exposure value SE3. The sub exposure parameter setting part 274 then finds a sub gain converted value by use of the following Equation. The sub gain converted value is obtained by converting the gain for the sub pixel signals to an exposure value.

$$SGA = SE3 - SST \quad \text{Equation 2}$$

In the above Equation, SGA indicates the sub gain converted value, and SST indicates the sub exposure time converted value. The sub exposure time converted value is obtained by converting the sub exposure time into an exposure value. Additionally, subtraction is made in the above Equation assuming that the sensitivity in the sub side is higher, while addition is made assuming that the sensitivity in the main side is higher.

The sub exposure parameter setting part 274 finds and sets the analog gain SAG, the digital gain SDG_IMG, and the digital gain SDG_DSP in the subside from the sub gain converted value SGA. The sub exposure parameter setting part 274 then supplies the analog gain SAG and the digital gain MDG_IMG to the sub solid state imaging device 220, and supplies the digital gain SDG_DSP to the image combination part 290.

The memory 273 is directed for holding the sensitivity difference converted value D, dE, and the program diagram.

Figure 8:
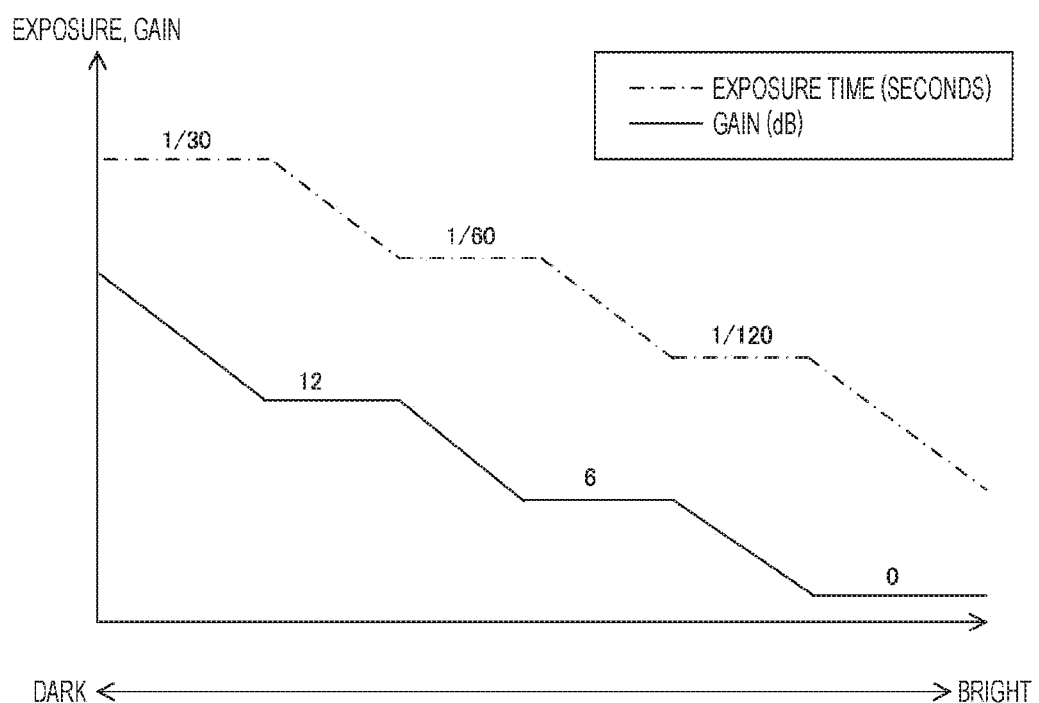
FIG. 8 is a diagram illustrating an exemplary program diagram according to the first embodiment of the present technology.

FIG. 8 is a diagram illustrating an exemplary program diagram according to the first embodiment of the present technology. The vertical axis in FIG. 8 indicates the exposure time or gain, and the horizontal axis indicates the appropriate exposure value. Further, a chain line indicates a trajectory of the exposure time, and a solid line indicates a trajectory of the gain. The main exposure parameter setting part 272 can acquire the main exposure time and gain corresponding to the main appropriate exposure value with reference to the program diagram. Additionally, there may be configured such that the trajectories on the program diagram are expressed in functions and only the coefficients of the functions are held in the memory 273. Further, there may be configured such that a table describing combinations of the exposure time and the gain per appropriate exposure value is held in the memory 273 on the basis of the program diagram.

Figure 9:
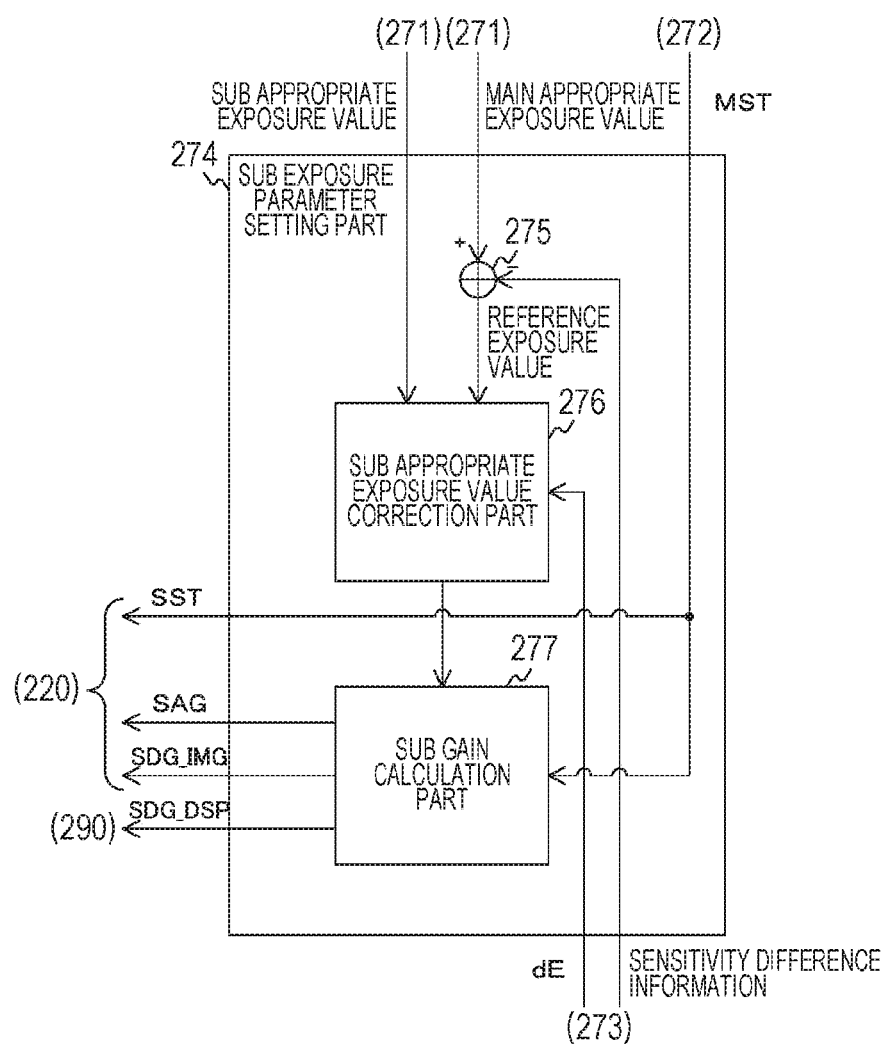
FIG. 9 is a block diagram illustrating an exemplary configuration of a sub exposure parameter setting part according to the first embodiment of the present technology.

FIG. 9 is a block diagram illustrating an exemplary configuration of the sub exposure parameter setting part 274 according to the first embodiment of the present technology. The sub exposure parameter setting part 274 includes a calculator 275, a sub appropriate exposure value correction part 276, and a sub gain calculation part 277.

The calculator 275 is directed for calculating the reference exposure value SEB by use of Equation 1. The calculator 275 supplies the reference exposure value SEB to the sub appropriate exposure value correction part 276.

The sub appropriate exposure value correction part 276 sets the reference exposure value SEB±dE as a permitted range, and corrects the sub appropriate exposure value SE1 to a value in the permitted range. If the sub appropriate exposure value SE1 is outside the permitted range, the sub appropriate exposure value correction part 276 supplies the reference exposure value+dE or the reference exposure value−dE as the corrected sub appropriate exposure value SE3 to the sub gain calculation part 277. On the other hand, if the sub appropriate exposure value SE1 is within the permitted range, the sub appropriate exposure value correction part 276 supplies the sub appropriate exposure value SE1 as the corrected sub appropriate exposure value SE3 to the sub gain calculation part 277. Additionally, the sub appropriate exposure value correction part 276 is an exemplary correction part described in CLAIMS.

The sub gain calculation part 277 is directed for calculating a sub gain in Equation 2. Additionally, the sub gain calculation part 277 is an exemplary gain calculation part described in CLAIMS.

[Exemplary Configuration of Image Combination Part]

Figure 10:
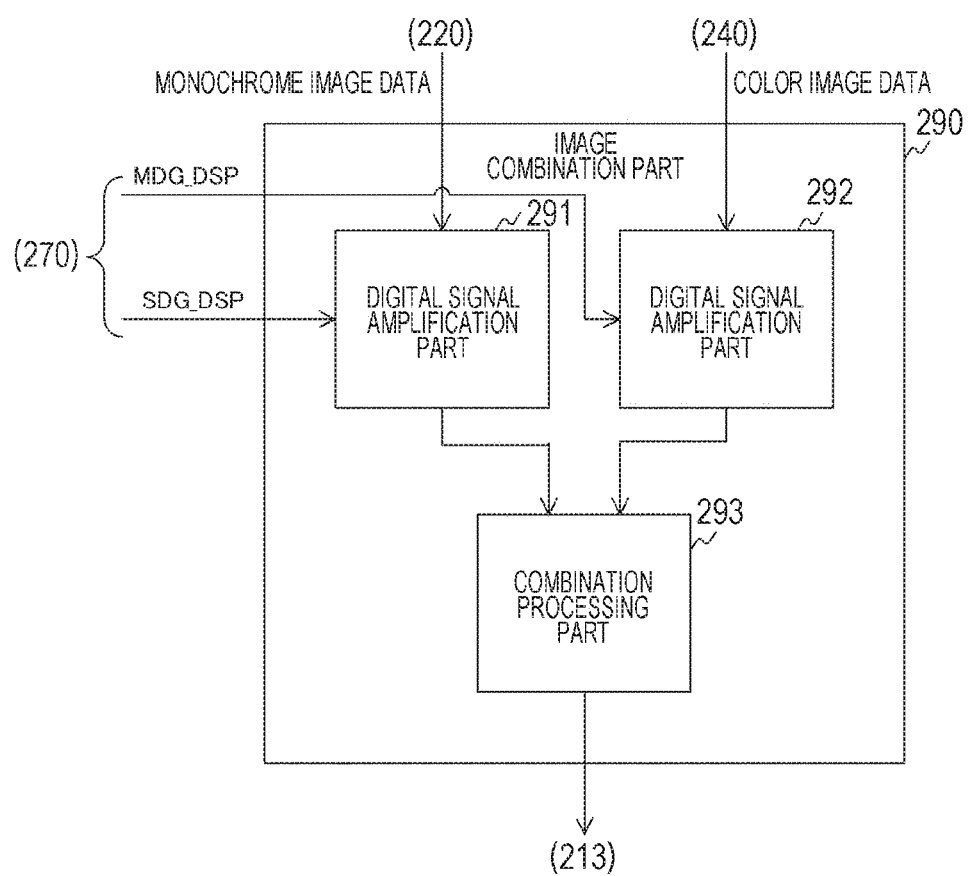
FIG. 10 is a block diagram illustrating an exemplary configuration of an image combination part according to the first embodiment of the present technology.

FIG. 10 is a block diagram illustrating an exemplary configuration of the image combination part 290 according to the first embodiment of the present technology. The image combination part 290 includes digital signal amplification parts 291 and 292, and a combination processing part 293.

The digital signal amplification parts 291 and 292 are realized by a digital signal processing (DSP) circuit, for example.

The digital signal amplification part 291 is directed for amplifying each item of the pixel data in the sub monochrome image data by the digital gain SDG_DSP. The digital signal amplification part 291 supplies the amplified monochrome image data to the combination processing part 293.

The digital signal amplification part 292 is directed for amplifying each item of the pixel data in the sub color image data by the digital gain MDG_DSP. The digital signal amplification part 292 supplies the amplified color image data to the combination processing part 293. Additionally, various digital signal processing such as white balance correction or demosaic processing are performed as needed in addition to amplification/combination by the digital signal amplification parts 291 and 292 in the image combination part 290.

The combination processing part 293 is directed for combining the amplified monochrome image data and color image data thereby to generate combined image data. The combination processing part 293 supplies the combined image data to the image output part 213.

Figure 11:
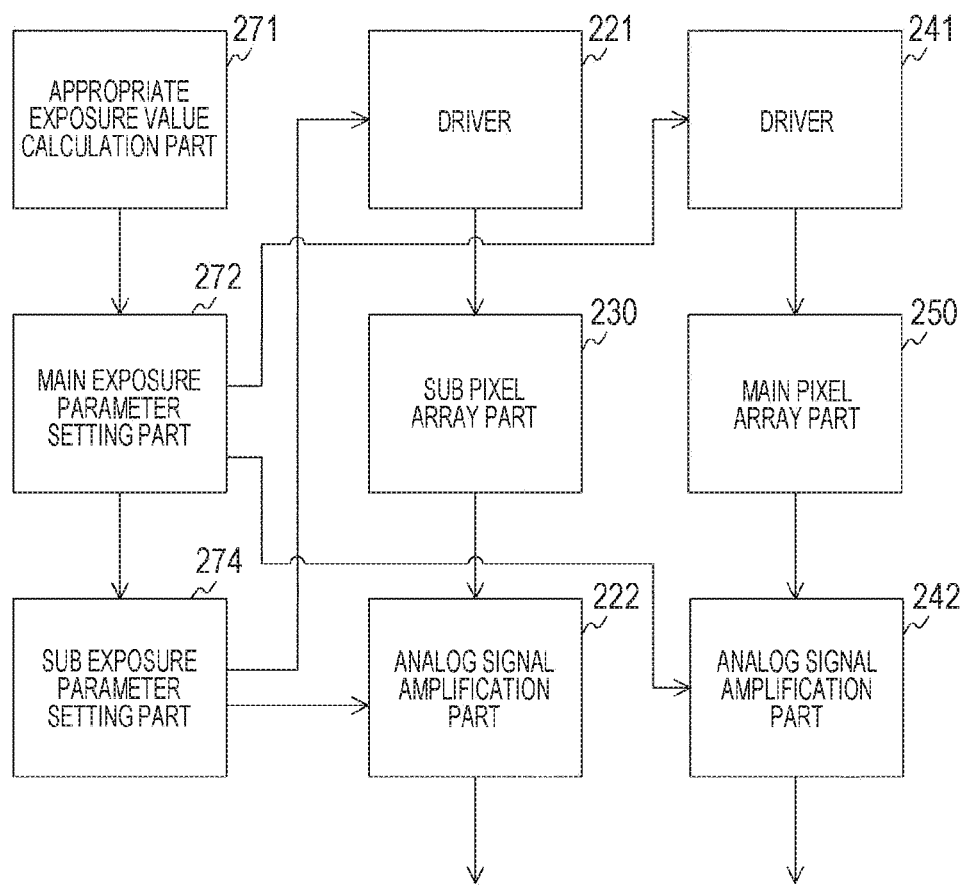
FIG. 11 is a collective block diagram illustrating components for exposure control according to the first embodiment of the present technology.

FIG. 11 is a collective diagram of components for exposure control according to the first embodiment of the present technology. The appropriate exposure value calculation part 271 calculates a sub appropriate exposure value and a main appropriate exposure value on the basis of the amount of sub measured light and the amount of main measured light.

The main exposure parameter setting part 272 finds and sets a main exposure time and a main gain from the main appropriate exposure value. The sub exposure parameter setting part 274 sets the same exposure time as in the main side for the sub side, and adjusts the gain on the basis of the difference in sensitivity and sets it in the sub side.

The driver 221 causes the sub pixel array part 230 to be exposed over the sub exposure time, and the driver 241 causes the main pixel array part 250 to be exposed over the main exposure time. Additionally, the circuit including the drivers 221 and 241 is an exemplary control part described in CLAIMS.

The analog signal amplification part 222 then amplifies the pixel signals from the sub pixel array part 230 by the sub analog gain, and the analog signal amplification part 242 amplifies the image signals from the main pixel array part 250 by the main analog gain. Additionally, the circuit including the analog signal amplification parts 222 and 242 is an exemplary amplification part described in CLAIMS.

Figure 12:
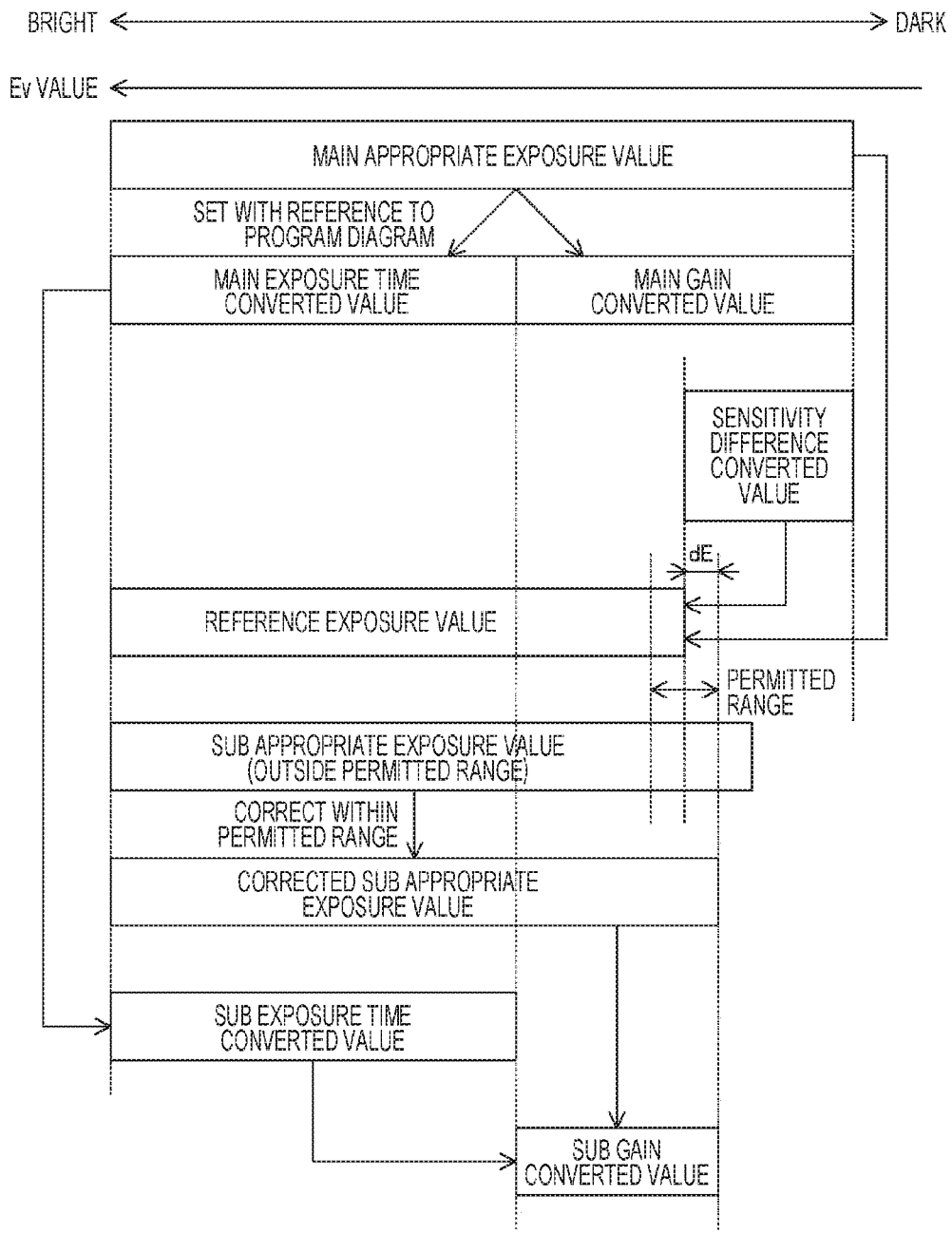
FIG. 12 is a diagram for explaining an exposure parameter setting method according to the first embodiment of the present technology.

FIG. 12 is a diagram for explaining an exposure parameter setting method according to the first embodiment of the present technology. The appropriate exposure value calculation part 271 calculates a sub appropriate exposure value and a main appropriate exposure value. The main exposure parameter setting part 272 finds an exposure time and a gain for the main appropriate exposure value, and sets them in the main side with reference to the program diagram.

The sub exposure parameter setting part 274 then subtracts the sensitivity difference converted value from the main appropriate exposure value to be the reference exposure value. The sub appropriate exposure value is then corrected to a value in the permitted range, or the reference exposure value±dE. For example, the sub appropriate exposure value is higher than the maximum value of the permitted range in FIG. 12. In this case, the sub exposure parameter setting part 274 limits the exposure value at the maximum value to be the corrected appropriate exposure value.

The difference in brightness between the sub side and the main side may be larger due to the difference in disparity or angle of field between the main side and the sub side, but in such a case, the appropriate exposure value is limited within the permitted range so that the dissociation of the main and sub exposure values can be restricted. Further, in a case where combination is possible only when the difference in the amount of exposure between the main side and the sub side is a certain level or less due to the specification of the image combination part 290, the permitted range is set depending on the specification so that the requirements of the specification can be met.

Further, the sub exposure parameter setting part 274 sets the sub exposure time at the same value as the main exposure time. The sub exposure parameter setting part 274 then subtracts the sub exposure time converted value from the corrected appropriate exposure value to find the sub gain converted value, and sets the sub gain.

The same exposure time as in the main side is set for the sub side under exposure control described above. Further, the value by which the main gain is adjusted on the basis of the difference in sensitivity is set as the sub gain. Thereby, the capturing apparatus 100 can capture monochrome image data and color image data with the same brightness.

Additionally, the sub exposure parameter setting part 274 limits the sub appropriate exposure value within the permitted range, but may use the value obtained by subtracting the sensitivity difference converted value and the sub exposure time converted value from the main appropriate exposure value as the sub gain converted value without the use of the sub appropriate exposure value.

Figure 13:
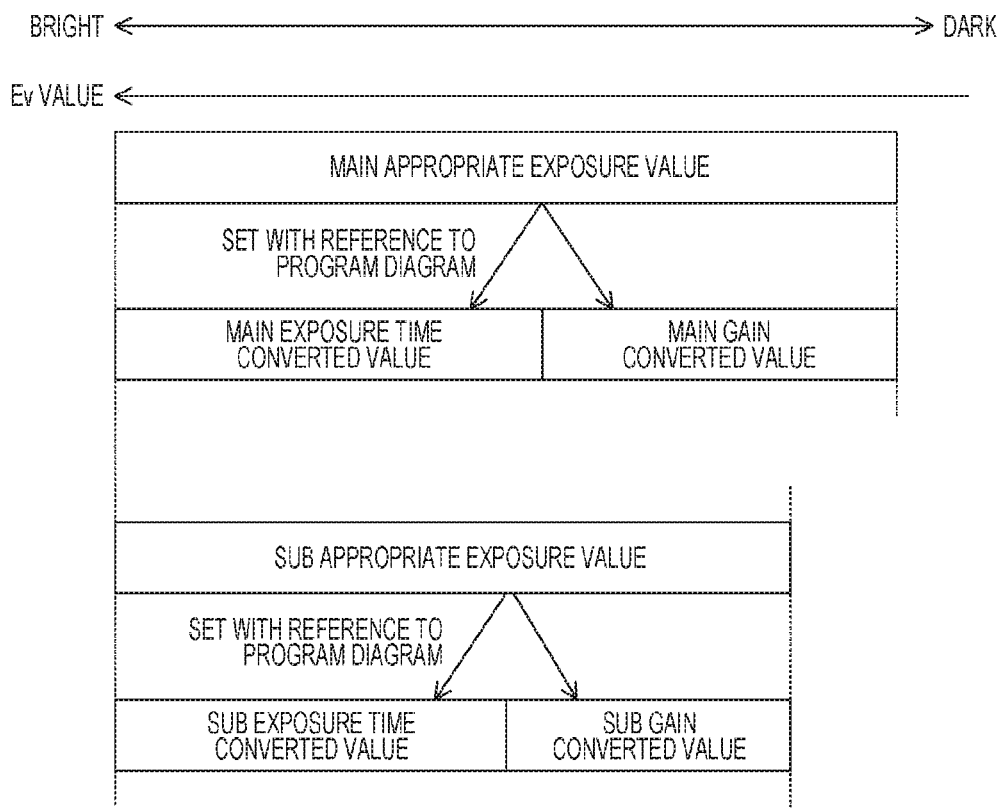
FIG. 13 is a diagram for explaining an exposure parameter setting method according to a comparative example.

FIG. 13 is a diagram for explaining an exposure parameter setting method according to a comparative example. The comparative example assumes that the capturing apparatus sets the exposure time and the gain from the appropriate exposure value individually in the main side and in the sub side not in consideration of the difference in sensitivity.

The capturing apparatus according to the comparative example sets the exposure time and the gain corresponding to the main appropriate exposure value in the main side with reference to the program diagram. Further, the capturing apparatus sets the exposure time and the gain corresponding to the sub appropriate exposure value in the sub side with reference to the program diagram.

In a case where the sensitivities are different between the main side and the sub side, the different amounts of measured light are acquired in the main side and in the sub side even under the same capturing condition, and thus the main appropriate exposure value and the sub appropriate exposure value are different. Thus, the different exposure times are set between the main side and the sub side. In this case, two items of image data with substantially the same brightness and the different amounts of blur of a moving object due to the difference in exposure time are captured. Consequently, image quality of the combined image data lowers.

If the main appropriate exposure value is applied to the sub side as it is, the capturing apparatus can set the same exposure time and gain in the main side and in the sub side. However, the difference in sensitivity is present between the main side and the sub side, and thus if the same exposure time and gain are set, two items of image data have different brightness.

To the contrary, the capturing apparatus 100 sets the same exposure time in the main side and the sub side, and adjusts the sub gain on the basis of the difference in sensitivity, thereby adjusting the brightness and the exposure time of the image data to be substantially the same between the main side and the sub side. Thereby, image quality of the combined image data can be enhanced.

[Exemplary Operations of Binocular Camera Module]

Figure 14:
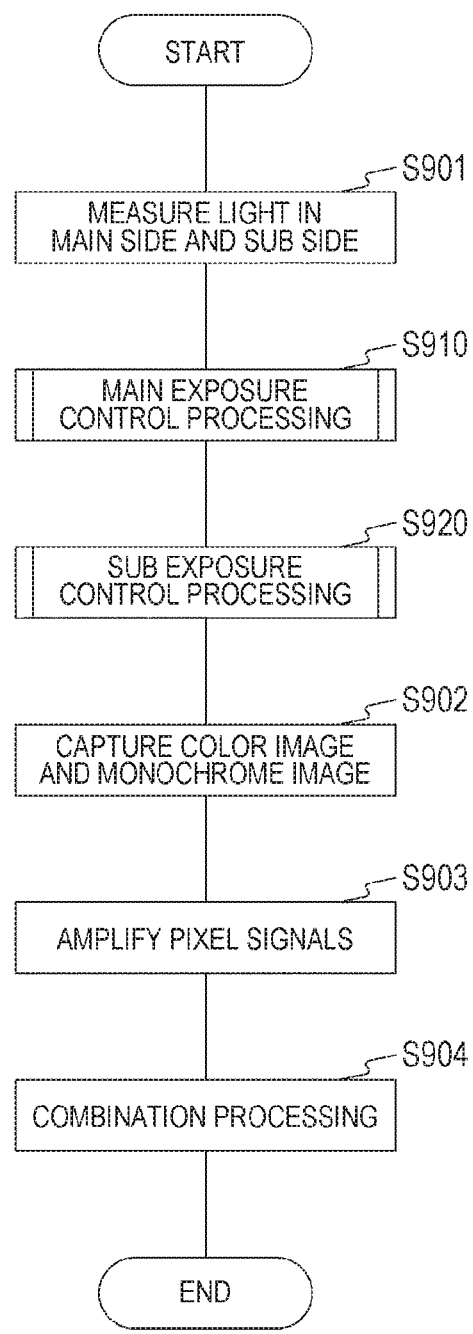
FIG. 14 is a flowchart illustrating exemplary operations of a binocular camera module according to the first embodiment of the present technology.

FIG. 14 is a flowchart illustrating exemplary operations of the binocular camera module 200 according to the first embodiment of the present technology. The operations start when the camera module control part 110 instructs to start capturing, for example.

The binocular camera module 200 measures a light in the main side and in the sub side, and generates the amount of main measured light and the amount of sub measured light (step S901). The binocular camera module 200 then performs the main exposure control processing of setting main exposure parameters (step S910), and performs the sub exposure control processing of setting sub exposure parameters (step S920).

The binocular camera module 200 then captures a color image and a monochrome image on the basis of the set exposure parameters (step S902). The binocular camera module 200 amplifies the pixel signals by the set gains (step S903), and performs the combination processing of combining the two images (step S904).

Figure 15:
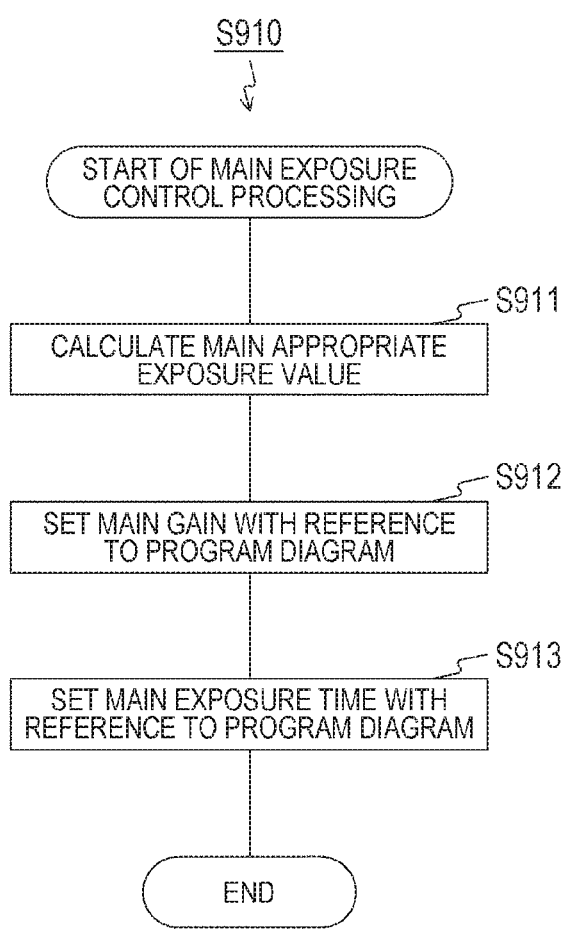
FIG. 15 is a flowchart illustrating a main exposure control processing according to the first embodiment of the present technology.

FIG. 15 is a flowchart illustrating the main exposure control processing according to the first embodiment of the present technology. The exposure control part 270 calculates the main appropriate exposure value from the amount of main measured light (step S911). The exposure control part 270 then finds the gain corresponding to the main appropriate exposure value and sets it in the main side (step S912), and finds the corresponding exposure time and sets it in the main side (step S913) with reference to the program diagram. The exposure control part 270 terminates the main exposure control processing after step S913.

Figure 16:
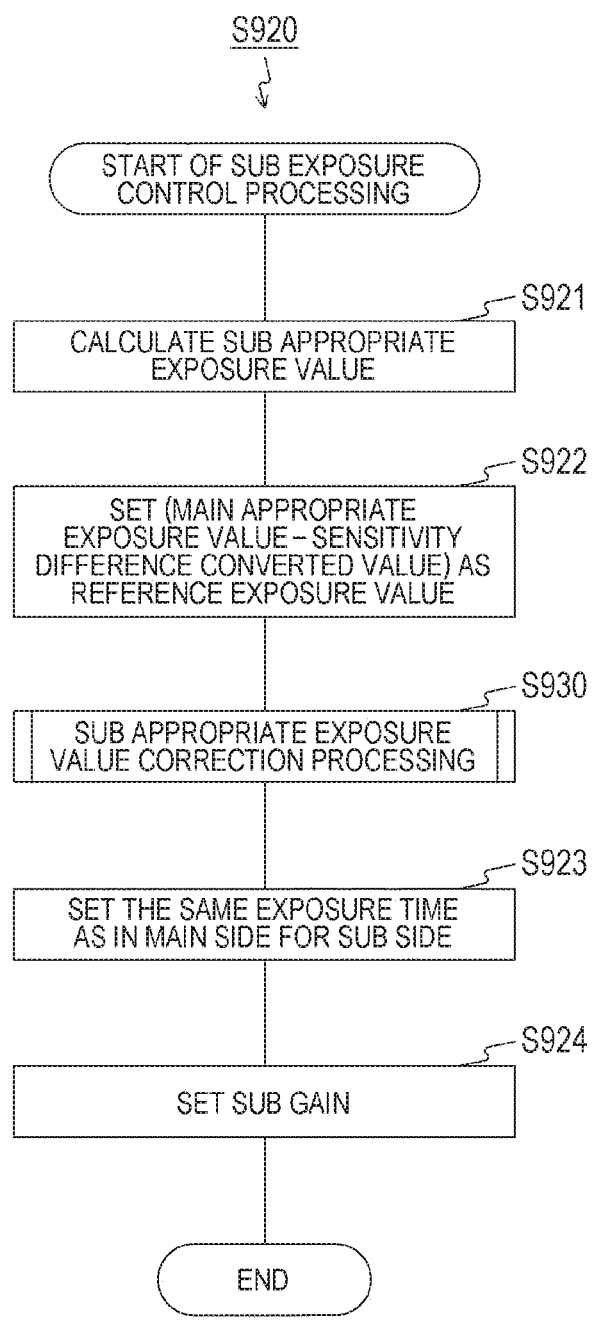
FIG. 16 is a flowchart illustrating a sub exposure control processing according to the first embodiment of the present technology.

FIG. 16 is a flowchart illustrating the sub exposure control processing according to the first embodiment of the present technology. The exposure control part 270 calculates the sub appropriate exposure value from the amount of sub measured light (step S921). The exposure control part 270 then calculates the difference between the main appropriate exposure value and the sensitivity difference converted value as the reference exposure value (step S922), and performs the sub appropriate exposure value correction processing of correcting the sub appropriate exposure value (step S930). The exposure control part 270 sets the same exposure time as in the main side for the sub side (step S923), and finds and sets the sub gain from the difference between the corrected sub appropriate exposure value and the sub exposure time converted value (step S924). The exposure control part 270 terminates the sub exposure control processing after step S924.

Figure 17:
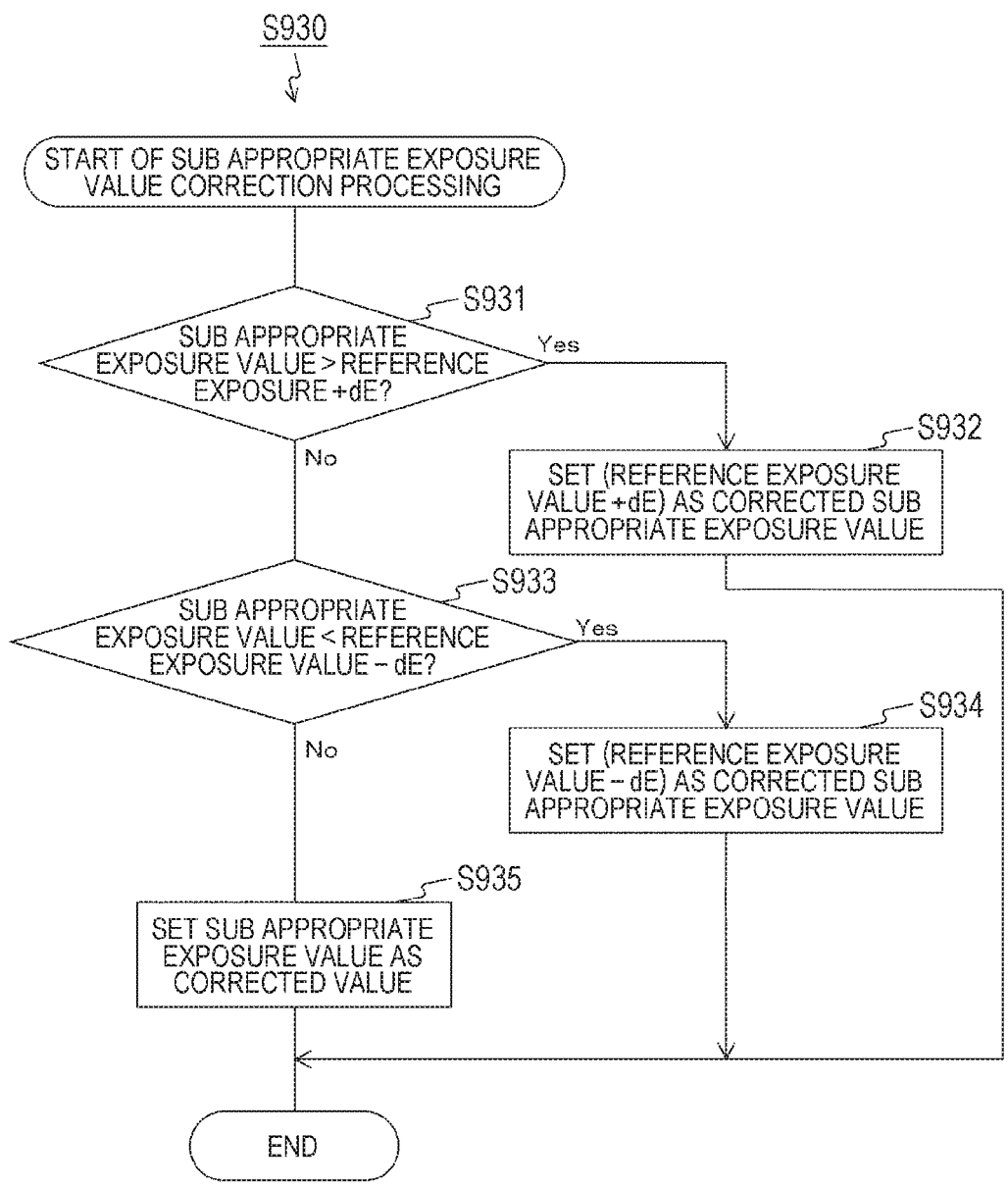
FIG. 17 is a flowchart illustrating a sub appropriate exposure value correction processing according to the first embodiment of the present technology.

FIG. 17 is a flowchart illustrating the sub appropriate exposure value correction processing according to the first embodiment of the present technology. The exposure control part 270 determines whether or not the sub appropriate exposure value is higher than the reference exposure value+dE (step S931). In a case where the sub appropriate exposure value is higher than the reference exposure value+dE (step S931: Yes), the exposure control part 270 assumes the value of the reference exposure value+dE to be the corrected sub appropriate exposure value (step S932).

On the other hand, in a case where the sub appropriate exposure value is equal to or lower than the reference exposure value+dE (step S931: No), the exposure control part 270 determines whether nor not the sub appropriate exposure value is lower than the reference exposure value−dE (step S933). In a case where the sub appropriate exposure value is lower than the reference exposure value−dE (step S933: Yes), the exposure control part 270 assumes the value of the reference exposure value−dE to be the corrected sub appropriate exposure value (step S934).

On the other hand, in a case where the sub appropriate exposure value is equal to or higher than the reference exposure value−dE (step S933: No), the exposure control part 270 assumes the sub appropriate exposure value to be the corrected sub appropriate exposure value (step S935). The exposure control part 270 terminates the sub appropriate exposure value correction processing after step S932, S934, or S935.

In this way, according to the first embodiment of the present technology, the capturing apparatus 100 sets the same exposure time between the main side and the sub side, and adjusts the gain on the basis of the difference in sensitivity, thereby capturing two images with the same brightness in the same exposure time.

[Variant]

The capturing apparatus 100 according to the first embodiment corrects the sub appropriate exposure value within the reference exposure value±dE found from the main appropriate exposure value, but in this method, a degree of reflection of the sub appropriate exposure value cannot be adjusted in the sub gain setting. If the capturing apparatus 100 weights and adds the reference exposure value and the sub appropriate exposure value, the degree of reflection of the sub appropriate exposure value can be changed by the weighting coefficient adjustment. The capturing apparatus 100 according to a variant of the first embodiment is different from that according to the first embodiment in that the reference exposure value and the sub appropriate exposure value are weighted and added.

Figure 18:
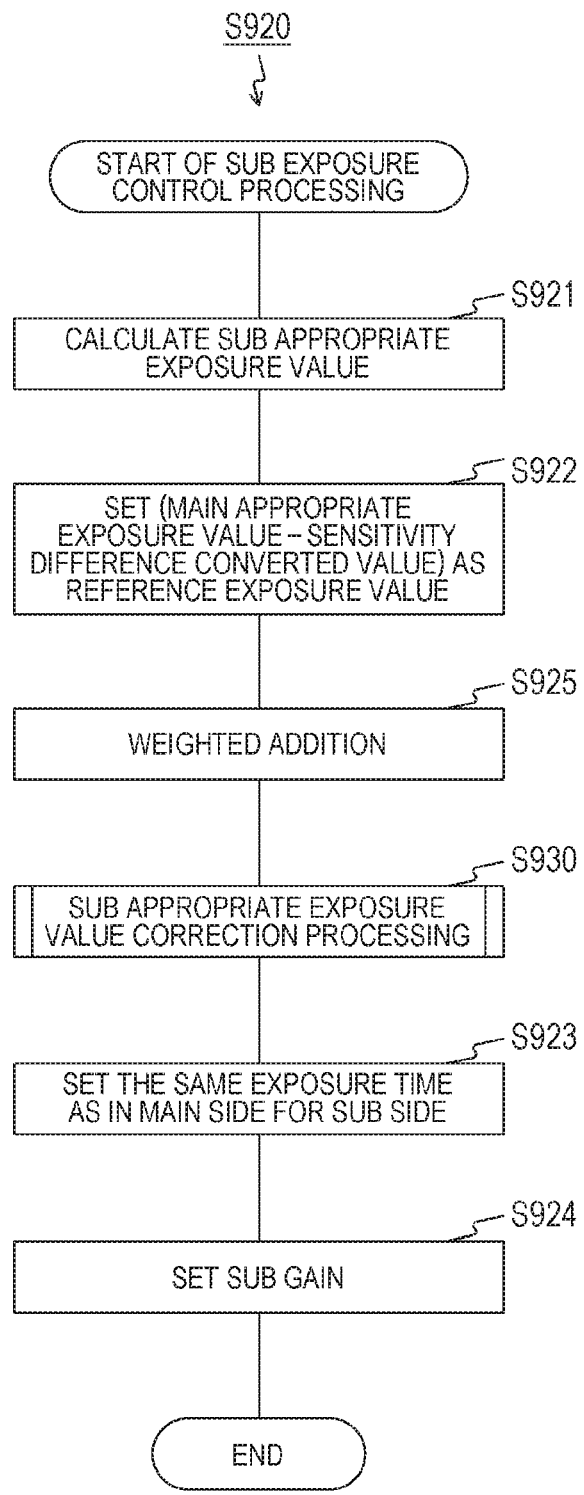
FIG. 18 is a flowchart illustrating a sub exposure control processing according to a variant of the first embodiment of the present technology.

FIG. 18 is a flowchart illustrating the sub exposure control processing according to the variant of the first embodiment of the present technology. The sub exposure control processing according to the variant of the first embodiment is different from that according to the first embodiment in that step S925 is further performed.

The exposure control part 270 calculates the reference exposure value SEB in Equation 1 (step S922), and performs weighting addition in the following Equation thereby to calculate a weighted addition value SE2 (step S925).

$$SE2=(A \times SEB+B \times SE1)/(A+B) \quad \text{Equation 3}$$

In the above Equation, A and B are weighting coefficients, and are set at real numbers.

The exposure control part 270 then corrects the weighted addition value SE2 to a value within the reference exposure value SEB±dE to be the corrected sub appropriate exposure value SE3 in the sub appropriate exposure value correction processing (step S930).

The light measurement areas may be offset between the main side and the sub side due to an influence of the disparity or the angles of field in the main side and in the sub side, and the weighting coefficients are adjusted in order to restrict the influence. For example, in a case where the sub light measurement area is offset from the main light measurement area but partially matches therewith, the weighting coefficients A and B are set depending on the offset amount. For example, the weighting coefficient A and the weighting coefficient B are set at "1" and "2," respectively.

Further, in a case where the sub light measurement area is completely offset from that of the main side, the weighting coefficient A and the weighting coefficient B are set at "0" and "1," respectively. Further, in a case where the main light measurement area matches with the sub one, the weighting coefficient A and the weighting coefficient B are set at "1" and "0," respectively Further, the weighting coefficients are adjusted depending on the specification of the image combination part 290 in addition to the influence of the disparity or the angles of field in the main side and in the sub side. For example, in a case where the amounts of main and sub exposure are required to be completely the same depending on the specification of the image combination part 290, the weighting coefficient A and the weighting coefficient B are set at "1" and "0," respectively. Further, in a case where the amount of sub espouser is emphasized, the weighting coefficient B is set at a value other than "0." For example, the weighting coefficient A is set at "0" or "2" and the weighting coefficient B is set at "1."

In this way, the capturing apparatus 100 according to the variant of the first embodiment of the present technology weights and adds the main appropriate exposure value SEB and the sub appropriate exposure value SE1, thereby adjusting the degree of reflection of the sub appropriate exposure value in the sub-side setting.

2. Second Embodiment

According to the first embodiment, the main exposure time and gain are calculated from the main appropriate exposure value, and the sub gain is calculated according to the exposure time. In the calculation method, however, the exposure value may not match with that of the main side if the sub gain does not have a negative value. A typical solid state imaging device is provided with an amplifier for amplification, but is not provided with a device or circuit for attenuation, and thus cannot set a negative gain. In this case, the exposure time is set such that the sub gain does not have a negative value, and the sub exposure time may be applied to the main side. The capturing apparatus 100 according to a second embodiment is different from that according to the first embodiment in that the sub exposure time is applied to the main side when the sub gain has a negative value.

Figure 19:
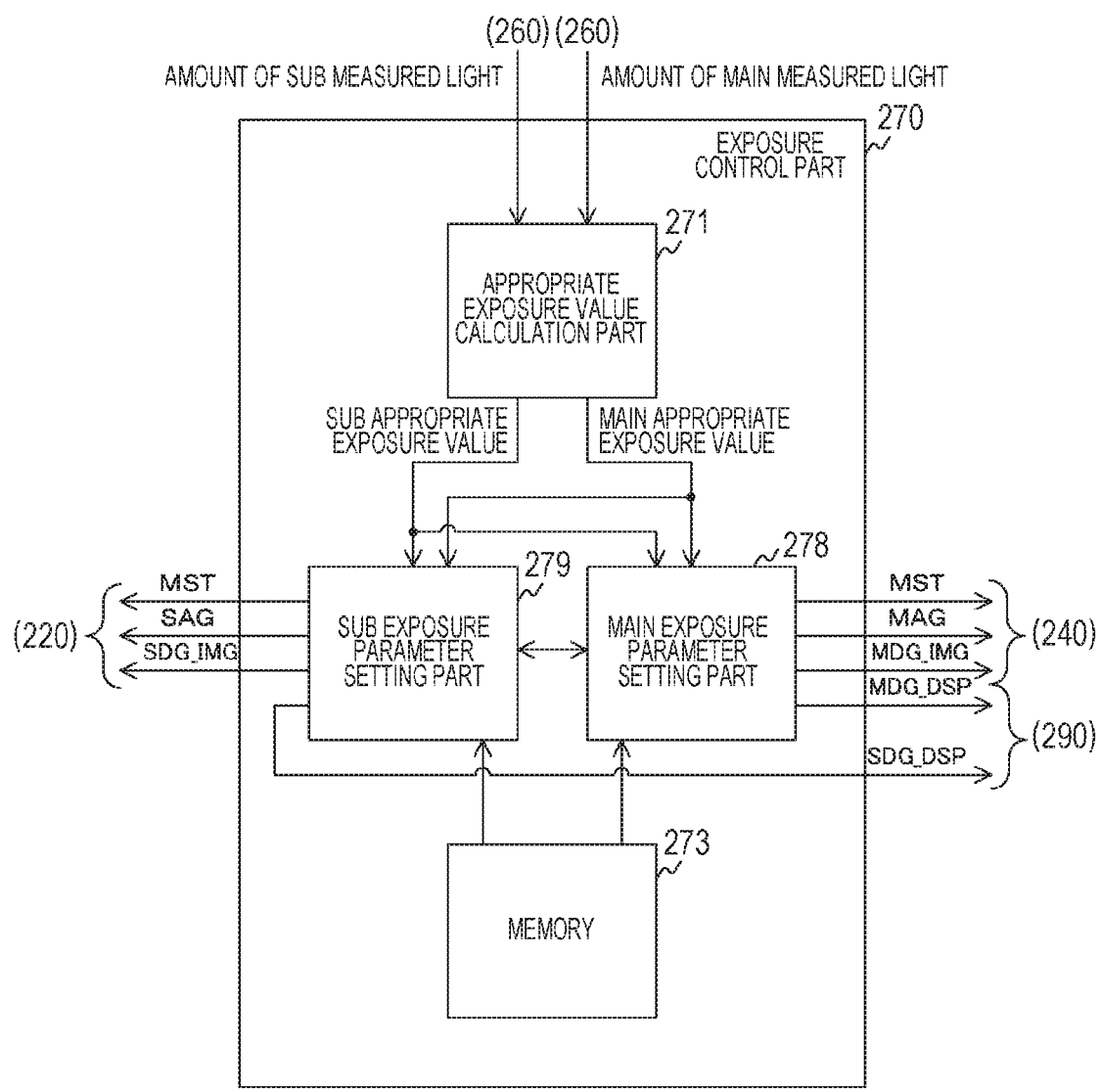
FIG. 19 is a block diagram illustrating an exemplary configuration of the exposure control part according to a second embodiment of the present technology.

FIG. 19 is a block diagram illustrating an exemplary configuration of the exposure control part 270 according to the second embodiment of the present technology. The configuration of the exposure control part 270 according to the second embodiment is different from that according to the first embodiment in that a main exposure parameter setting part 278 is provided instead of the main exposure parameter setting part 272. Further, the configuration of the exposure control part 270 according to the second embodiment is different from that according to the first embodiment in that a sub exposure parameter setting part 279 is provided instead of the sub exposure parameter setting part 274.

The sub exposure parameter setting part 279 finds a sub gain in the similar method as in the first embodiment, and determines whether or not the sub gain has a negative value. In a case where the sub gain has a negative value, the sub exposure parameter setting part 279 finds a value obtained by adding the negative sub gain converted value and the main exposure time converted value as the sub exposure time converted value. That is, the sub exposure parameter setting part 279 shortens the exposure time by the negative gain. Further, the sub gain is set at "0" dB. The sub exposure parameter setting part 279 then supplies the sub exposure time converted value to the main exposure parameter setting part 278.

When receiving the sub exposure time converted value, the main exposure parameter setting part 278 sets the same exposure time as in the sub side for the main side. The main exposure parameter setting part 278 then sets the gain corresponding to the difference between the main appropriate exposure value and the main exposure time converted value in the main side.

Figure 20:
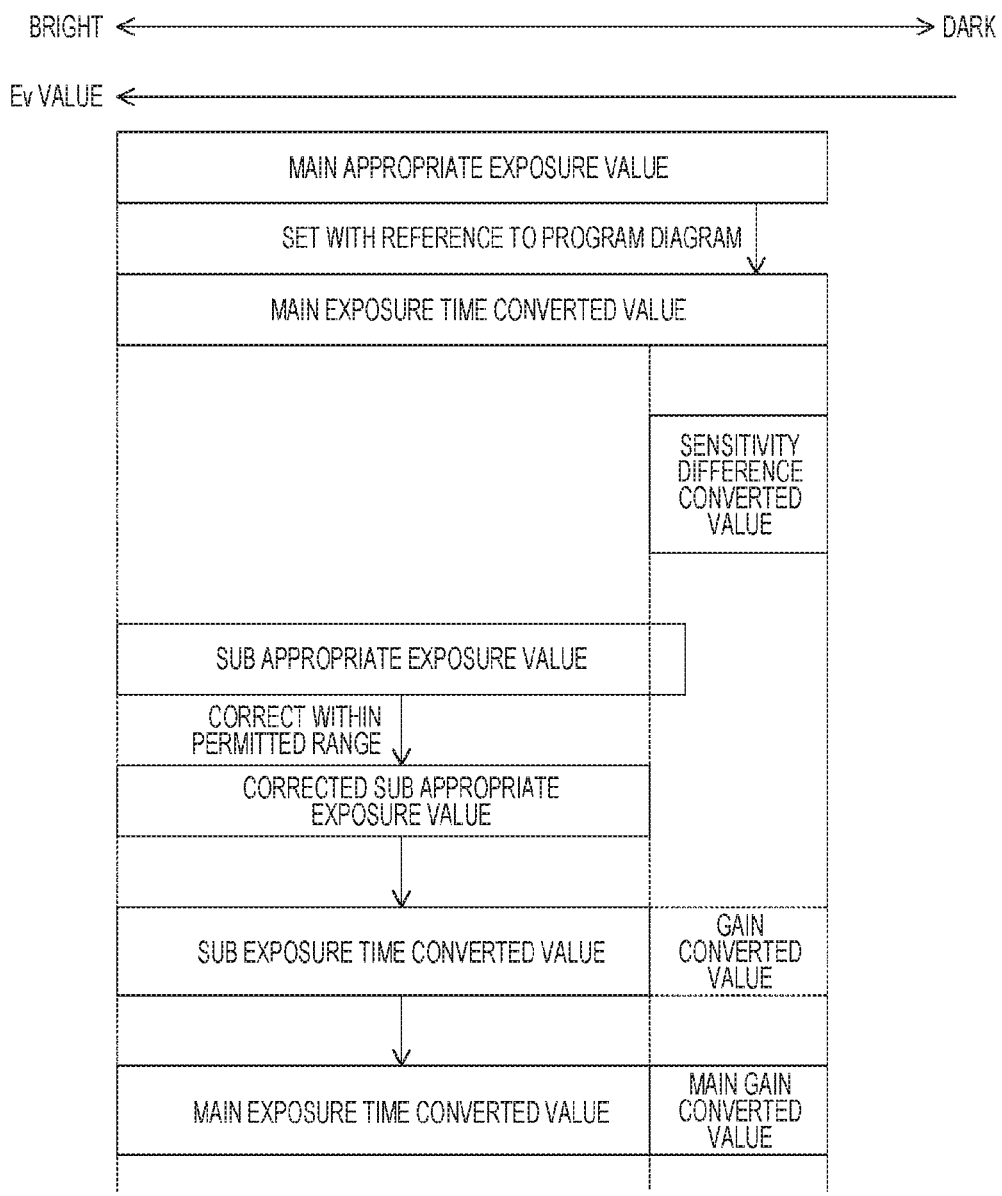
FIG. 20 is a diagram for explaining an exposure parameter setting method according to the second embodiment of the present technology.

FIG. 20 is a diagram for explaining an exposure parameter setting method according to the second embodiment of the present technology. The exposure control part 270 sets the main exposure time and gain from the main appropriate exposure value with reference to the program diagram. Then exposure control part 270 then calculates the sub gain when setting the same sub exposure time as in the sub side. Here, the sub gain may have a negative value. For example, when the main exposure time converted value is higher than the sub appropriate exposure time, the exposure value does not match with that of the main side if the sub analog gain does not have a negative value.

In such a case, the exposure control part 270 finds a value obtained by adding the negative sub gain converted value and the main exposure time converted value as the sub exposure time converted value. The exposure control part 270 then sets the exposure time corresponding to the sub exposure time converted value in the sub side, and sets the same exposure time between the main side and the sub side. The exposure control part 270 then sets the gain corresponding to the difference between the main appropriate exposure value and the main exposure time converted value in the main side. The exposure control part 270 then sets the sub gain at "0" dB.

Figure 21:
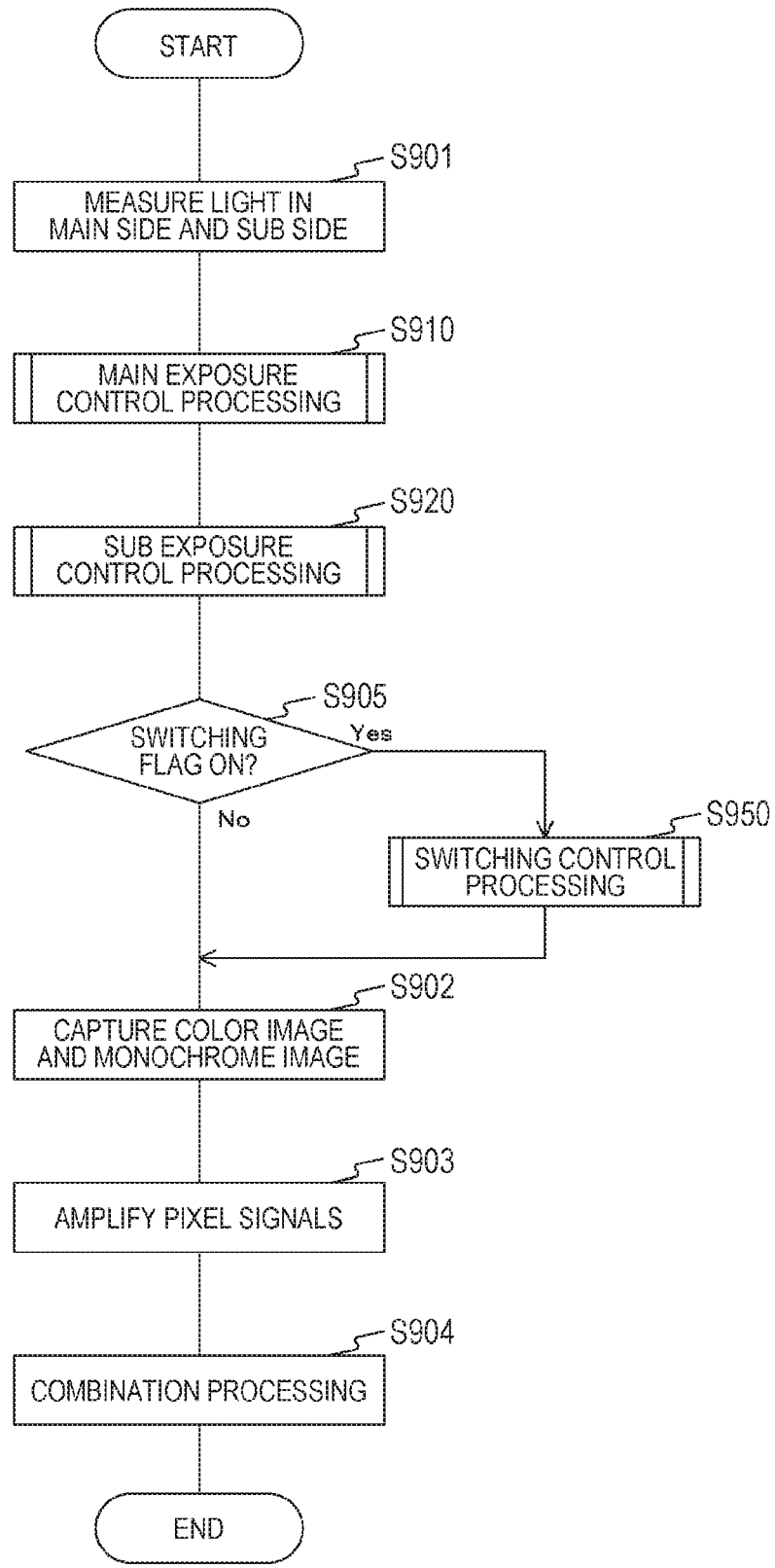
FIG. 21 is a flowchart illustrating exemplary operations of the binocular camera module according to the second embodiment of the present technology.

FIG. 21 is a flowchart illustrating exemplary operations of the binocular camera module 200 according to the second embodiment of the present technology. The operations of the binocular camera module 200 according to the second embodiment are different from those in the first embodiment in that steps S905 and S950 are further performed.

The binocular camera module 200 determines whether or not the switching flag is on (step S905) after the sub exposure control processing (step S920). In a case where the switching flag is on (step S905: Yes), the binocular camera module 200 performs the switching control processing of applying the sub exposure time to the main side (step S950).

In a case where the switching flag is off (step S905: No) or after S950, the binocular camera module 200 performs the processing in and subsequent to step S902.

Figure 22:
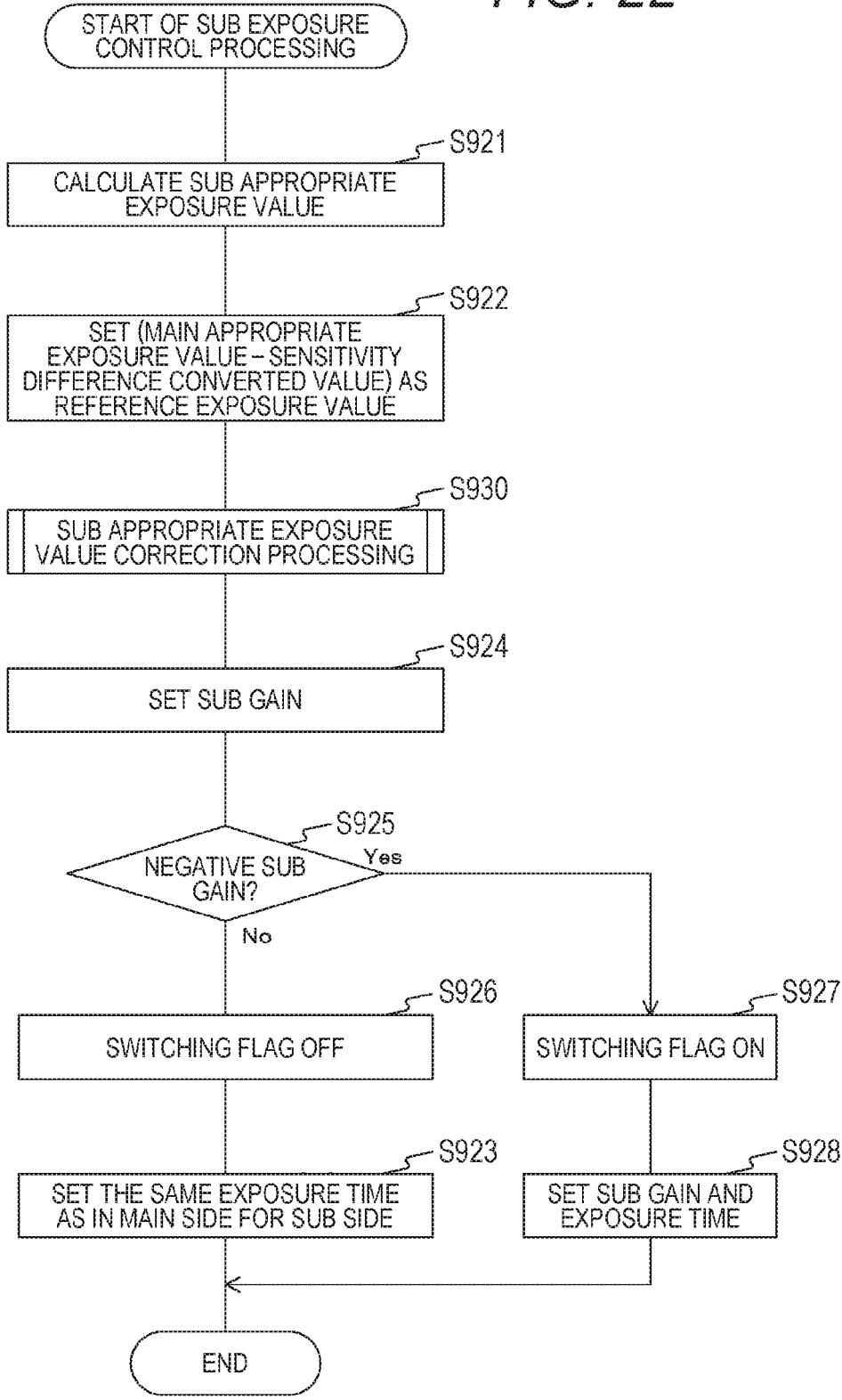
FIG. 22 is a flowchart illustrating a sub exposure control processing according to the second embodiment of the present technology.

FIG. 22 is a flowchart illustrating the sub exposure control processing according to the second embodiment of the present technology. The sub exposure control processing according to the second embodiment is different from that according to the first embodiment in that steps S924 to S928 are further performed. The exposure control part 270 sets the sub gain (step S924), and determines whether or not the gain has a negative value (step S925).

In a case where the gain does not have a negative value (step S925: No), the exposure control part 270 switches off the switching flag (step S926), and sets the same exposure time as in the main side for the sub side (step S923). On the other hand, in a case where the gain converted value has a negative value (step S925: Yes), the exposure control part 270 switches on the switching flag (step S927). The exposure control part 270 then sets the gain corresponding to the difference between the main appropriate exposure value and the sensitivity difference converted value in the sub side, and sets the sub gain at "0" dB (step S928). The exposure control part 270 terminates the main exposure control processing after step S923 or S928. Additionally, a variant of performing weighting addition may be applied in the second embodiment.

Figure 23:
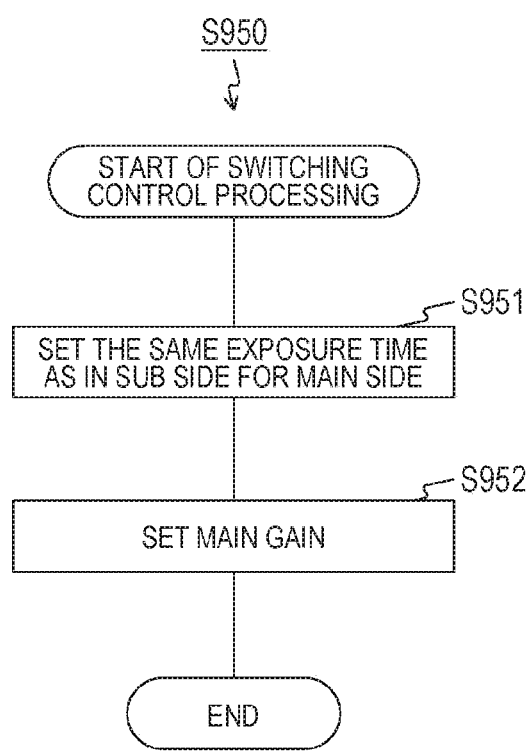
FIG. 23 is a flowchart illustrating a switching control processing according to the second embodiment of the present technology.

FIG. 23 is a flowchart illustrating the switching control processing according to the second embodiment of the present technology. The exposure control part 270 sets the same exposure time as in the sub side for the main side (step S951). Further, the exposure control part 270 sets the gain corresponding to the difference between the main appropriate exposure value and the main exposure time converted value in the main side (step S952). The exposure control part 270 terminates the switching control processing after step S952.

In this way, according to the second embodiment of the present technology, in a case where the sub gain has a negative value, the exposure control part 270 shortens the sub exposure time and applies it to the main side, thereby further adjusting the brightness even in a case where the sub gain has a negative value.

3. Third Embodiment

The capturing apparatus 100 according to the first embodiment captures and combines monochrome image data and color image data by the sub solid state imaging device 220 without a color filter and the main solid state imaging device 240 with a color filter. With the configuration, however, there cannot be performed an application assuming that both of two images to be combined are color images. When two items of color image data are to be captured, the sub solid state imaging device 220 has only to be provided with a color filter. The binocular camera module 200 according to the third embodiment is different from that according to the first embodiment in that two items of color image data are captured and combined.

Figure 24:
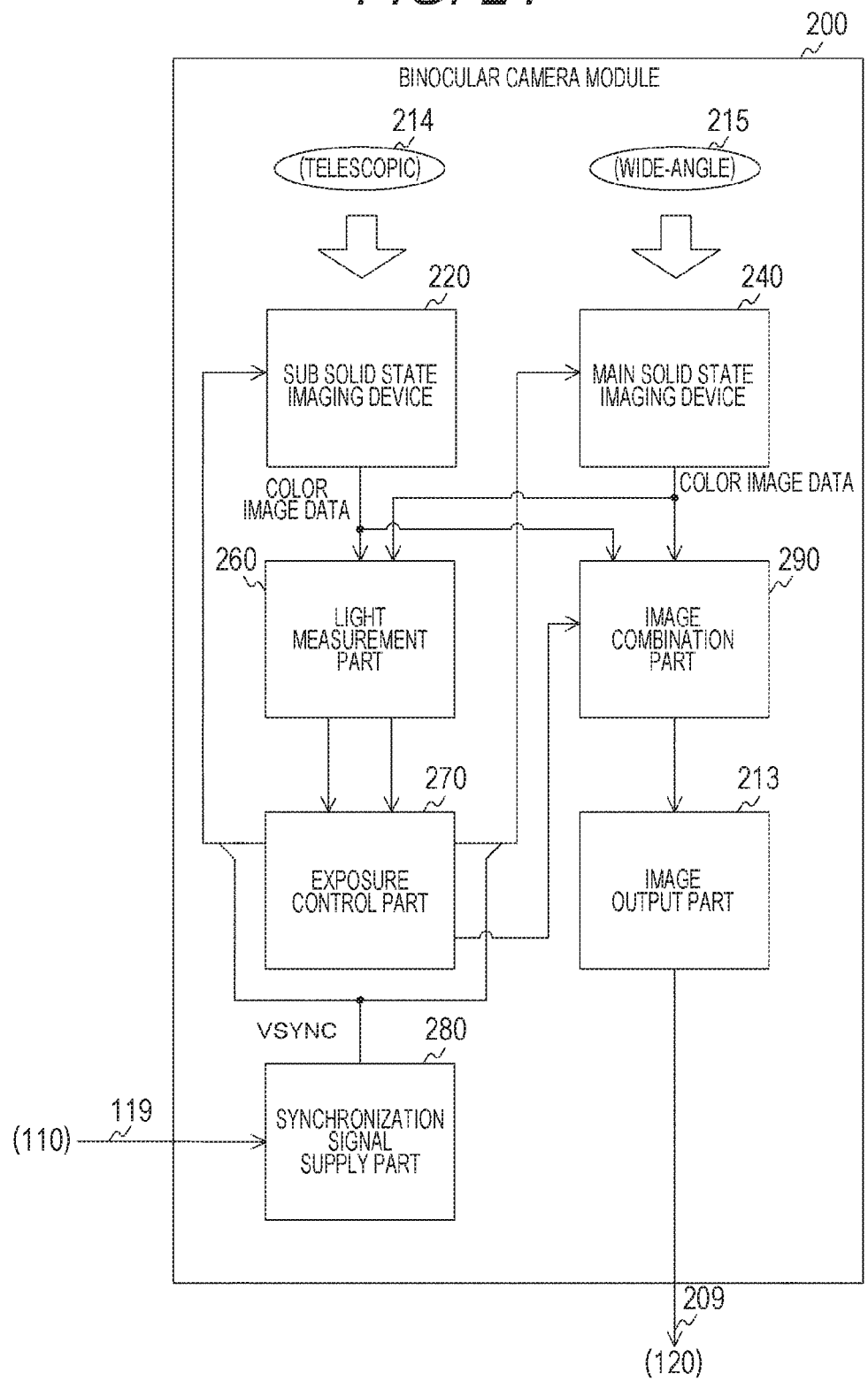
FIG. 24 is a block diagram illustrating an exemplary configuration of the binocular camera module according to a third embodiment of the present technology.

FIG. 24 is a block diagram illustrating an exemplary configuration of the binocular camera module 200 according to the third embodiment of the present technology. The binocular camera module 200 according to the third embodiment is different from that according to the first embodiment in that a telescopic lens 214 and a wide-angle lens 215 are provided instead of the capturing lenses 211 and 212 and the sub solid state imaging device 220 is provided with a color filter.

The telescopic lens 214 has a narrower angle of field than the wide-angle lens 215. The telescopic lens 214 guides the condensed light to the sub solid state imaging device 220. The wide-angle lens 215 has a wider angle of field than the telescopic lens 214. The wide-angle lens 215 guides the condensed light to the main solid state imaging device 240.

Further, both the sub solid state imaging device 220 and the main solid state imaging device 240 are provided with a color filter, but the pixel sensitivities are different between the main side and the sub side.

When the user increases the magnification at a predetermined value Th1 or more, the image combination part 290 according to the third embodiment does not combine but selects and outputs telescopic color image data. Further, when the user decreases the magnification at a predetermined value Th2 or less, the image combination part 290 selects and output wide-angle color image data. When the user operates the magnification between the predetermined values Th1 and Th2, the image combination part 290 embeds the telescopic color image data in the wide-angle color image data thereby to generate an image depending on the magnification.

In this way, according to the third embodiment of the present technology, the sub solid state imaging device 220 is also provided with a color filter, and thus the capturing apparatus 100 can capture and combine two items of color image data.

4. Fourth Embodiment

The binocular capturing apparatus 100 according to the first embodiment sets two items of image data at the same brightness by gain adjustment, but three or more items of image data can be set at the same brightness in a compound-eye capturing system with three or more lenses. The capturing system according to a fourth embodiment is different from that according to the first embodiment in that three or more items of image data are controlled at the same brightness in a compound-eye capturing system.

Figure 25:
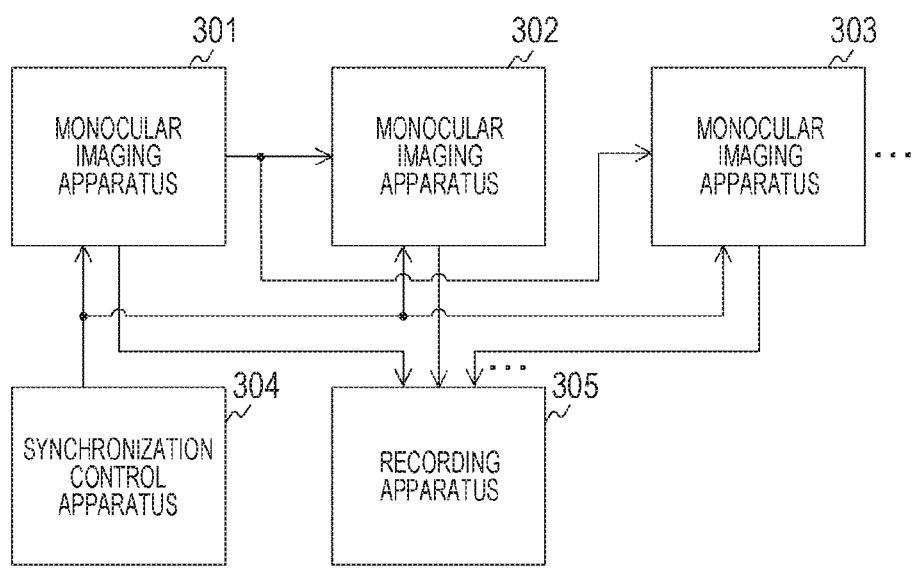
FIG. 25 is a block diagram illustrating an exemplary configuration of a capturing system according to a fourth embodiment of the present technology.

FIG. 25 is a block diagram illustrating an exemplary configuration of the capturing system according to the fourth embodiment of the present technology. The capturing system includes three or more monocular capturing apparatuses such as monocular capturing apparatuses 301, 302, and 303, a synchronization control apparatus 304, and a recording apparatus 305.

The synchronization control apparatus 304 is directed for synchronizing the operations of the monocular capturing apparatus 301 and the like in response to the supplied vertical synchronization signal VSYNC.

The configuration of the monocular capturing apparatus 301 is similar to that of the main monocular camera module 201 according to the first embodiment. The configurations of the other monocular capturing apparatuses such as the monocular capturing apparatus 302 are similar to that of the sub monocular camera module 202 according to the first embodiment. However, the monocular capturing apparatus 301 and the like according to the fourth embodiment are not provided with the recording part 120, the synchronization signal supply part 280, and the image combination part 290.

The recording apparatus 305 is directed for recording image data captured by the monocular capturing apparatus 301 and the like. Additionally, the recording apparatus 305 is an exemplary recording part described in CLAIMS.

For example, the monocular capturing apparatus 301 and the like are arranged at predetermined monitoring positions in a plant and image data is analyzed so that the capturing system can detect an abnormality in the plant. The capturing system can capture three or more items of image data with the same exposure time and brightness, thereby enhancing the image data analysis accuracy.

In this way, according to the fourth embodiment of the present technology, the gains are adjusted in the three or more monocular capturing apparatuses 301 and the like, thereby capturing three or more items of image data with the same exposure time and brightness.

5. Application to Moving Object

The technology according to the present disclosure (the present technology) is applicable to various products. For example, the technology according to the present disclosure may be realized as an apparatus mounted on any kind of moving object such as vehicle, electric vehicle, hybrid vehicle, motorcycle, bicycle, personal mobility, airplane, drone, ship, or robot.

Figure 26:
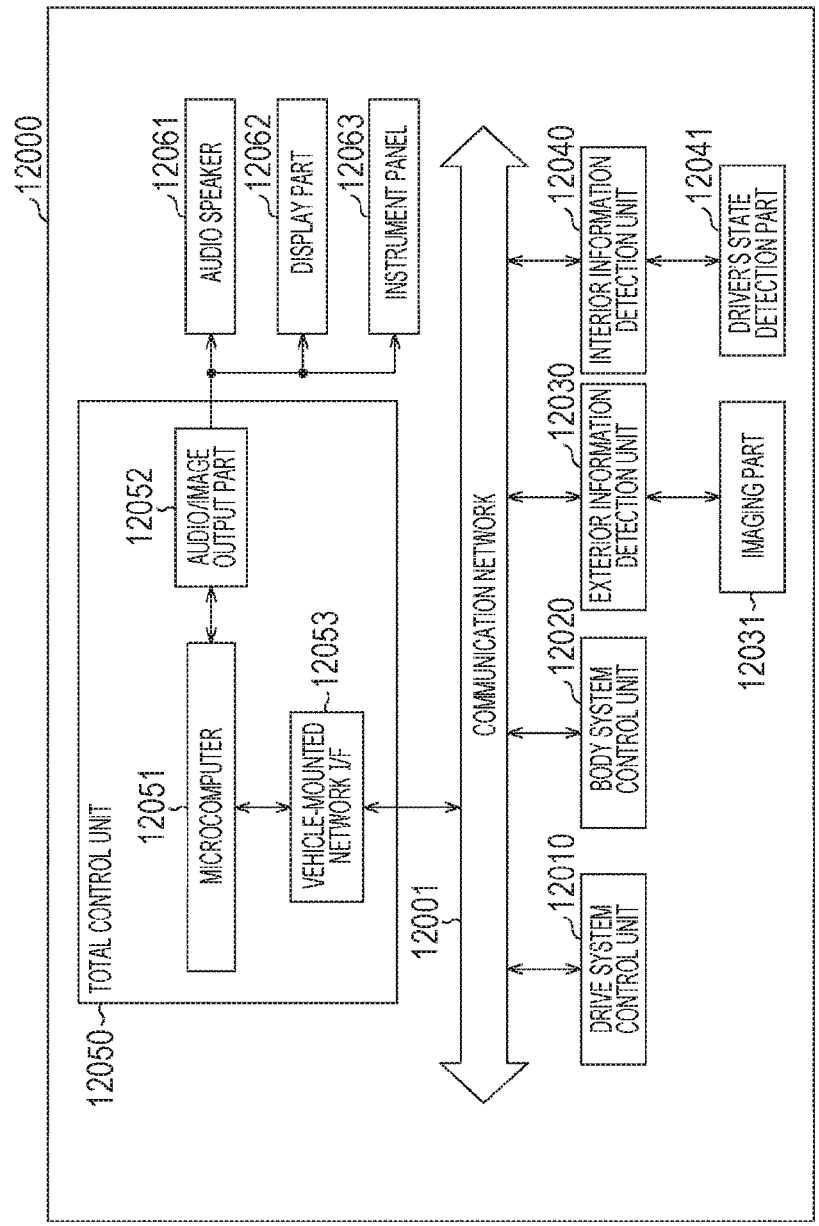
FIG. 26 is a block diagram illustrating an exemplary schematic configuration of a vehicle control system.

FIG. 26 is a block diagram illustrating an exemplary schematic configuration of a vehicle control system as an exemplary moving object control system to which the technology according to the present disclosure can be applied.

A vehicle control system 12000 includes a plurality of electronic control units connected via a communication network 12001. In the example illustrated in FIG. 26, the vehicle control system 12000 includes a drive system control unit 12010, a body system control unit 12020, an exterior information detection unit 12030, an interior information detection unit 12040, and a total control unit 12050. Further, a microcomputer 12051, an audio/image output part 12052, and a vehicle-mounted network interface (I/F) 12053 are illustrated as the functional components of the total control unit 12050.

The drive system control unit 12010 controls the operations of the apparatuses for the vehicle drive system according to various programs. For example, the drive system control unit 12010 functions as a control apparatus for a driving force generation apparatus such as internal engine or drive motor for generating a driving force of the vehicle, a driving force transmission mechanism for transmitting a driving force to the wheels, a steering mechanism for adjusting the steering angle of the vehicle, a braking apparatus for generating a braking force of the vehicle, and the like.

The body system control unit 12020 controls the operations of various apparatuses equipped in the vehicle body according to various programs. For example, the body system control unit 12020 functions as a control apparatus for a keyless entry system, a smart key system, a power window apparatus, or various lights such as head lights, back lights, brake light, directional signals, or fog light. In this case, the body system control unit 12020 can have a radio wave originated from a portable machine as a key, or signals of various switches input. The body system control unit 12020 receives the input of the radio wave or signals, and controls the door lock apparatus, the power window apparatus, the lights, and the like of the vehicle.

The exterior information detection unit 12030 detects the information indicating the exterior of the vehicle mounting the vehicle control system 12000 thereon. For example, the exterior information detection unit 12030 is connected with a capturing part 12031. The exterior information detection unit 12030 causes the capturing part 12031 to capture an image of the exterior of the vehicle, and receives the captured image. The exterior information detection unit 12030 may perform a processing of detecting an object such as person, vehicle, obstacle, road sign, or character on the road, or a distance detection processing on the basis of the received image.

The capturing part 12031 is a light sensor for receiving a light and outputting an electric signal depending on the amount of received light. The capturing part 12031 can output the electric signal as an image, or can output it as distance measurement information. Further, a light received by the capturing part 12031 may be a visible ray or a non-visible ray such as infrared ray.

The interior information detection unit 12040 detects the information indicating the interior of the vehicle. The interior information detection unit 12040 is connected with a driver's state detection part 12041 for detecting a driver's state, for example. The driver's state detection part 12041 includes a camera for capturing the driver, for example, and the interior information detection unit 12040 may calculate a degree of fatigue or a degree of concentration of the driver or may determine whether or not the driver is asleep at the wheel on the basis of the detection information input from the driver's state detection part 12041.

The microcomputer 12051 can calculate a control target value of the driving force generation apparatus, the steering mechanism, or the braking apparatus on the basis of the information indicating the exterior or interior of the vehicle obtained by the exterior information detection unit 12030 or the interior information detection unit 12040, and can output a control instruction to the drive system control unit 12010. For example, the microcomputer 12051 can perform cooperative control for realizing the advanced driver assistance system (ADAS) functions including collision avoidance or collision alleviation of the vehicle, follow-up traveling based on inter-vehicle distance, traveling at kept vehicle speed, collision alarm of the vehicle, lane deviation alarm of the vehicle, and the like.

Further, the microcomputer 12051 controls the driving force generation apparatus, the steering mechanism, the braking apparatus, or the like on the basis of the information indicating the surrounding of the vehicle obtained by the exterior information detection unit 12030 or the interior information detection unit 12040, thereby performing cooperative control for automatic driving of autonomous traveling irrespective of driver's operation, and the like.

Further, the microcomputer 12051 can output a control instruction to the body system control unit 12020 on the basis of the information indicating the exterior of the vehicle obtained by the exterior information detection unit 12030. For example, the microcomputer 12051 can control the head lights depending on the position of a leading vehicle or an oncoming vehicle detected by the exterior information detection unit 12030, and can perform cooperative control in order to achieve anti-glare such as switching from high beam to low beam.

The audio/image output part 12052 transmits an output signal of at least one of audio and image to an output apparatus capable of visually or aurally notifying information to the passengers in the vehicle or the outside of the vehicle. In the example of FIG. 26, an audio speaker 12061, a display part 12062, and an instrument panel 12063 are illustrated as output apparatuses by way of example. The display part 12062 may include at least one of an on-board display and a head-up display, for example.

Figure 27:
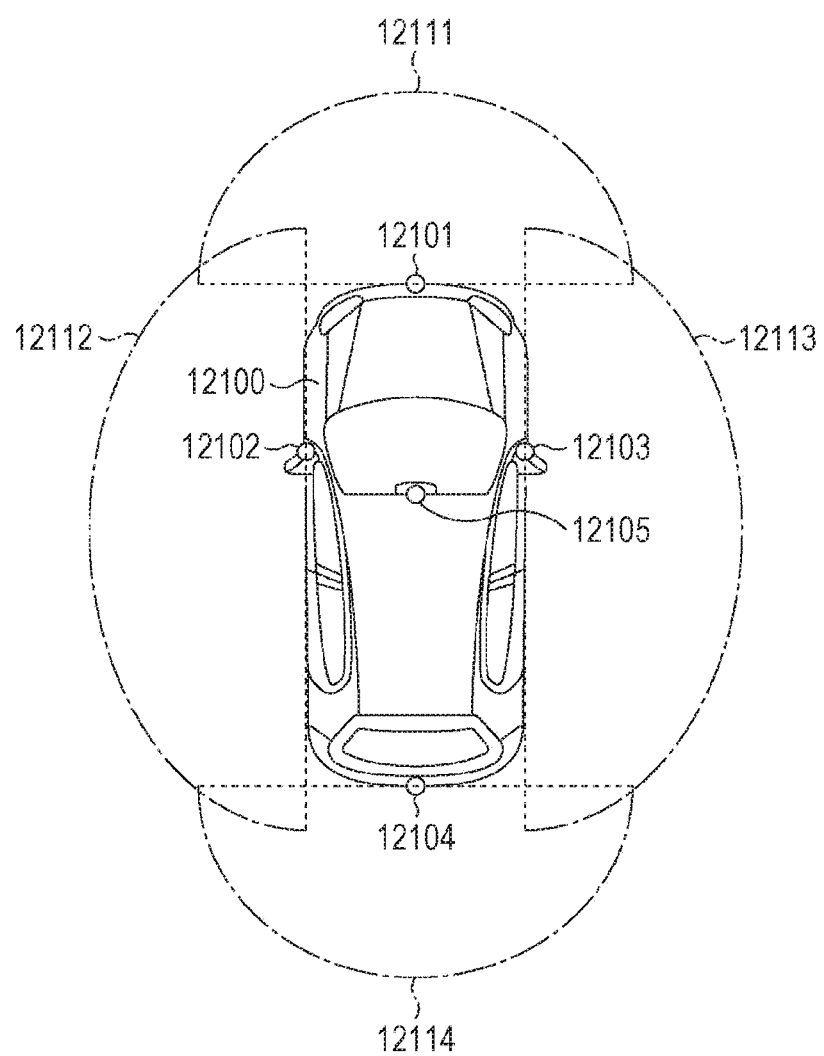
FIG. 27 is an explanatory diagram illustrating exemplary installation positions of an exterior information detection part and capturing parts.

FIG. 27 is a diagram illustrating exemplary installation positions of the capturing part 12031.

In FIG. 27, the capturing part 12031 has capturing parts 12101, 12102, 12103, 12104, and 12105 in the vehicle 12100.

The capturing parts 12101, 12102, 12103, 12104, and 12105 are provided at the front nose, the side mirrors, the rear bumper or back door of the vehicle 12100, and at the top part of the front shield inside the vehicle, respectively, for example. The capturing part 12101 provided at the front nose and the capturing part 12105 provided at the top part of the front shield inside the vehicle mainly obtain images in front of the vehicle 12100. The capturing parts 12102 and 12103 provided at the side mirrors mainly obtain images on both sides of the vehicle 12100. The capturing part 12104 provided at the rear bumper or back door mainly obtains an image behind the vehicle 12100. The images in front of the vehicle obtained by the capturing parts 12101 and 12105 are mainly used to detect a leading vehicle, a pedestrian, an obstacle, a traffic light, a road sign, a traffic lane, or the like.

Additionally, FIG. 27 illustrates exemplary capturing ranges of the capturing parts 12101 to 12104. A capturing range 12111 indicates a capturing range of the capturing part 12101 provided at the front nose, the capturing ranges 12112 and 12113 indicate the capturing ranges of the capturing parts 12102 and 12103 provided at the side mirrors, respectively, and a capturing range 12114 indicates a capturing range of the capturing part 12104 provided at the rear bumper or back door. For example, the image data captured by the capturing parts 12101 to 12104 are overlapped thereby to obtain a perspective image of the vehicle 12100 viewed from above.

At least one of the capturing parts 12101 to 12104 may have a function of obtaining distance information. For example, at least one of the capturing parts 12101 to 12104 may be a stereo camera configured of a plurality of imaging devices, or may be an imaging device having pixels for phase difference detection.

For example, the microcomputer 12051 finds a distance to each stereoscopic object in the capturing ranges 12111 to 12114 and a temporal change in the distance (relative speed to the vehicle 12100) on the basis of the distance information obtained from the capturing parts 12101 to 12104, thereby extracting, as a leading vehicle, a stereoscopic object traveling at a predetermined speed (0 km/h or more, for example) substantially in the same direction as the vehicle 12100, which is the closest stereoscopic object to the vehicle 12100 on the road. Further, the microcomputer 12051 can set an inter-vehicle distance to be previously secured behind the leading vehicle, and can perform automatic brake control (including follow-up stop control), automatic acceleration control (including follow-up start control), or the like. Cooperative control for automatic driving of autonomous traveling irrespective of driver's operation, and the like can be performed in this way.

For example, the microcomputer 12051 can classify and extract stereoscopic data regarding stereoscopic objects into two-wheel vehicle, standard-sized vehicle, large-sized vehicle, pedestrian, power pole, and the like on the basis of the distance information obtained from the capturing parts 12101 to 12104, and can use it for automatic obstacle avoidance. For example, the microcomputer 12051 discriminates the obstacles around the vehicle 12100 into obstacles capable of being visually confirmed by the driver of the vehicle 12100 and obstacles difficult to visually be confirmed by the driver of the vehicle 12100. The microcomputer 12051 then determines a collision risk indicating a degree of risk of collision with each obstacle, and outputs an alarm to the driver via the audio speaker 12061 or the display part 12062 or performs forcible deceleration or avoidance steering via the drive system control unit 12010 when there is a collision possibility over a set value of collision risk, thereby performing driving support for collision avoidance.

At least one of the capturing parts 12101 to 12104 may be an infrared camera for detecting an infrared ray. For example, the microcomputer 12051 determines whether or not a pedestrian is present in the images captured by the capturing parts 12101 to 12104, thereby recognizing the pedestrian. The pedestrian is recognized in a procedure of extracting the characteristic points in the images captured by the capturing parts 12101 to 12104 as infrared cameras and a procedure of performing a pattern matching processing on a series of characteristic points indicating the contour of an object and determining whether or not the contour of the object is a pedestrian, for example. When the microcomputer 12051 determines that a pedestrian is present in the images captured by the capturing parts 12101 to 12104 and recognizes the pedestrian, the audio/image output part 12052 controls the display part 12062 to overlap a square contour line for emphasis on the recognized pedestrian for display. Further, the audio/image output part 12052 may control the display part 12062 to display an icon or the like indicating a pedestrian at a desired position.

An exemplary vehicle control system to which the technology according to the present disclosure can be applied has been described above. The technology according to the present disclosure can be applied to the capturing part 12031 among the above-described constituents, for example. Specifically, for example, the binocular camera module 200 of FIG. 3 can be applied to the capturing part 12031 of FIG. 26. The technology according to the present disclosure is applied to the capturing part 12031 thereby to capture a plurality of items of image data with the same image quality and enhancing image quality of combined image data.

Additionally, the embodiments are examples for implementing the present technology, and the items according to the embodiments have the correspondences with the specific items of the invention in CLAIMS, respectively. Similarly, the specific items according to the invention in CLAIMS have the correspondences with the items according to the embodiments of the present technology denoted with the same names, respectively. However, the present technology is not limited to the embodiments, and various modifications can be made to the embodiments without departing from the spirit.

Further, the processing procedures described in the above embodiments may be assumed to be a method including the procedures, or may be assumed to be a program for causing a computer to perform the procedures or a recording medium storing the program. The recording medium may employ a compact disc (CD), a minidisc (MD), a digital versatile disc (DVD), a memory card, a Blu-ray (registered trademark) disc, or the like.

Additionally, the effects described in the present specification are merely exemplary and are not limited, and other effects may be obtained.

Additionally, the present technology can take the following configurations.

(1) A capturing apparatus including:
a first pixel array part in which first pixels for generating first pixel signals are arranged;
a second pixel array part in which second pixels for generating second pixel signals are arranged;
a first setting part configured to set an exposure time and a first gain for the first pixel signals on the basis of an appropriate exposure value;
a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels;
a control part configured to cause the first and second pixel array parts to be exposed over the exposure time; and
an amplification part configured to amplify the output first and second pixel signals by the first and second gains.

(2) The capturing apparatus according to (1),
in which the appropriate exposure value includes a first appropriate exposure value calculated from the first pixel signals and a second appropriate exposure value calculated from the second pixel signals,
the first setting part sets the exposure time and the first gain on the basis of the first appropriate exposure value, and
the second setting part calculates the second gain from the first appropriate exposure value, the difference in sensitivity, and the exposure time.

(3) The capturing apparatus according to (2),
in which in a case where a gain calculated from the first appropriate exposure value, the difference in sensitivity, and the exposure time takes a negative value, the second setting part acquires a new exposure time from the calculated gain and the exposure time, and sets the second gain at zero, and
when acquiring the new exposure time, the first setting part sets a gain calculated from the new exposure time and the first appropriate exposure value as the first gain.
(4) The capturing apparatus according to (2) or (3),
in which the second setting part includes:
a calculator configured to calculate a reference exposure value from the first appropriate exposure value and a sensitivity difference converted value obtained by converting the difference in sensitivity to an exposure value;
a correction part configured to correct the second appropriate exposure value and output it as a corrected appropriate exposure value on the basis of the reference exposure value; and
a gain calculation part configured to calculate the second gain from a difference between the corrected appropriate exposure value and a value obtained by converting the exposure time to an exposure value.
(5) The capturing apparatus according to (4),
in which the correction part corrects the second appropriate exposure value to a value within a predetermined permitted range including the reference exposure value.
(6) The capturing apparatus according to (4),
in which the correction part corrects a value obtained by weighting and adding the reference exposure value and the second appropriate exposure value to a value within a predetermined permitted range including the reference exposure value.
(7) The capturing apparatus according to any of (1) to (6),
in which the first pixels include a plurality of pixels configured to receive pieces of light with mutually different wavelengths, and
the second pixels receive pieces of light with the same wavelength, respectively.
(8) The capturing apparatus according to any of (1) to (7), further including:
a first capturing lens configured to condense and guide a light to the first pixel array part; and
a second capturing lens configured to condense and guide a light to the second pixel array part, in which the first capturing lens has a different angle of field from a different angle of field of the second capturing lens.
(9) The capturing apparatus according to any of (1) to (8), further including:
an AD conversion part configured to convert the first and second pixel signals to first and second pixel data,
in which the first gain includes a first analog gain and a first digital gain,
the second gain includes a second analog gain and a second digital gain, and
the amplification part includes:
an analog signal amplification part configured to amplify the first and second pixel signals by first and second analog gains; and
a digital signal amplification part configured to amplify the first and second pixel data by first and second digital gains.
(10) A capturing module including:
a first pixel array part in which first pixels for generating first pixel signals are arranged;
a second pixel array part in which second pixels for generating second pixel signals are arranged;
a first setting part configured to set an exposure time and a first gain for the first pixel signals on the basis of an appropriate exposure value;
a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels;
a control part configured to cause the first and second pixel array parts to be exposed over the exposure time;
an amplification part configured to amplify the output first and second pixel signals by the first and second gains; and
an image output part configured to output image data generated from the first and second pixel signals.
(11) A capturing system including:
a first pixel array part in which first pixels for generating first pixel signals are arranged;
a second pixel array part in which second pixels for generating second pixel signals are arranged;
a first setting part configured to set an exposure time and a first gain for the first pixel signals on the basis of an appropriate exposure value;
a second setting part configured to adjust the first gain on the basis of a difference in sensitivity between a first monocular camera module provided with the first pixel array part and a second monocular camera module provided with the second pixel array part, and to set the adjusted first gain as a second gain for the second pixel signals generated by the second pixels;
a control part configured to cause the first and second pixel array parts to be exposed over the exposure time;
an amplification part configured to amplify the output first and second pixel signals by the first and second gains; and
a recording part configured to record image data generated from the first and second pixel signals.
(12) A capturing apparatus control method including:
a first setting procedure of setting a first gain and an exposure time for first pixel signals from a second pixel array part out of a first pixel array part in which first pixels for generating the first pixel signals are arranged and the second pixel array part in which second pixels for generating second pixel signals are arranged on the basis of an appropriate exposure value;
a second setting procedure of adjusting the first gain on the basis of a difference in sensitivity between a first monocular camera module provided with the first pixel array part and a second monocular camera module provided with the second pixel array part, and setting the adjusted first gain as a second gain for the second pixel signals;
a control procedure of exposing the first and second pixel array parts over the exposure time; and
an amplification procedure of amplifying the output first and second pixel signals by the first and second gains.

REFERENCE SIGNS LIST

100 Capturing apparatus
110 Camera module control part
120 Recording part
200 Binocular camera module 201, 202 Monocular camera module
203 Coupling member
211, 212 Capturing lens
213 Image output part
214 Telescopic lens
215 Wide-angle lens
220 Sub solid state imaging device
221, 241 Driver
222, 242 Analog signal amplification part
223, 243 AD conversion part
224, 244, 291, 292 Digital signal amplification part
230 Sub pixel array part
231 Pixel
240 Main solid state imaging device
250 Main pixel array part
251 R pixel
252 G pixel
253 B pixel
260 Light measurement part
270 Exposure control part
271 Appropriate exposure value calculation part
272, 278 Main exposure parameter setting part
273 Memory
274, 279 Sub exposure parameter setting part
275 Calculator
276 Sub appropriate exposure value correction part
277 Sub gain calculation part
280 Synchronization signal supply part
290 Image combination part
293 Combination processing part
301, 302, 303 Monocular capturing apparatus
304 Synchronization control apparatus
305 Recording apparatus
12101, 12102, 12103, 12104, 12105 Capturing part

The invention claimed is:

1. A capturing apparatus, comprising:
a first monocular camera module;
a second monocular camera module;
a first pixel array in the first monocular camera module, wherein the first pixel array includes first pixels configured to generate first pixel signals;
a second pixel array in the second monocular camera module, wherein the second pixel array includes second pixels configured to generate second pixel signals; and
circuitry configured to:
calculate a first exposure value from the first pixel signals;
calculate a second exposure value from the second pixel signals;
set, based on the first exposure value and the second exposure value, an exposure time and a first gain for the first pixel signals;
adjust the first gain based on a difference in sensitivity between the first monocular camera module and the second monocular camera module;
calculate a second gain for the second pixel signals based on the adjusted first gain, the first exposure value, the difference in sensitivity, and the exposure time;
acquire, based on the second gain being a negative value, a new exposure time from the second gain and the exposure time;
set the first gain based on the new exposure time and the first exposure value;
set, based on the second gain being the negative value, the second gain at zero;
control exposure of each of the first pixel array and the second pixel array over the new exposure time;
amplify an output of the first pixel signals by the first gain; and
amplify an output of the second pixel signals by the second gain.

2. The capturing apparatus according to claim 1, wherein the circuitry is further configured to:
acquire a sensitivity difference converted value based on conversion of the difference in sensitivity to a first specific exposure value;
calculate a reference exposure value from the first exposure value and the sensitivity difference converted value;
correct the second exposure value based on the reference exposure value and output the corrected second exposure value as a corrected exposure value;
acquire a first specific value based on conversion of the exposure time to a second specific exposure value; and
calculate the second gain from a difference between the corrected exposure value and the first specific value.

3. The capturing apparatus according to claim 2, wherein the circuitry is further configured to correct the second exposure value to a second specific value within a specific permitted range, and
the specific permitted range includes the reference exposure value.

4. The capturing apparatus according to claim 2, wherein the circuitry is further configured to:
weight and add the reference exposure value and the second exposure value to a third specific value for determination of a specific result, wherein
the third specific value is within a specific permitted range, and
the specific permitted range includes the reference exposure value;
acquire a second specific value based on the specific result; and
correct the acquired second specific value.

5. The capturing apparatus according to claim 1, wherein the first pixels include a first plurality of pixels configured to receive pieces of light with mutually different wavelengths, and
the second pixels include a second plurality of pixels configured to receive pieces of light with a same wavelength.

6. The capturing apparatus according to claim 1, further comprising:
a first capturing lens configured to condense and guide light to the first pixel array; and
a second capturing lens configured to condense and guide light to the second pixel array, wherein an angle of field of the first capturing lens is different from an angle of field of the second capturing lens.

7. The capturing apparatus according to claim 1, wherein the circuitry is further configured to:
convert the first pixel signals to first pixel data; and
convert the second pixel signals to second pixel data,
the first gain includes a first analog gain and a first digital gain,
the second gain includes a second analog gain and a second digital gain, and
the circuitry is further configured to amplify the first pixel signals and the second pixel signals by the first analog gain and the second analog gain; and the circuitry is further configured to amplify the first pixel data and the second pixel data by the first digital gain and the second digital gain.

8. A capturing module, comprising:
a first monocular camera module;
a second monocular camera module;
a first pixel array in the first monocular camera module, wherein the first pixel array includes first pixels configured to generate first pixel signals;
a second pixel array in the second monocular camera module, wherein the second pixel array includes second pixels configured to generate second pixel signals; and
circuitry configured to:
  calculate a first exposure value from the first pixel signals;
  calculate a second exposure value from the second pixel signals;
  set, based on the first exposure value and the second exposure value, an exposure time and a first gain for the first pixel signals;
  adjust the first gain based on a difference in sensitivity between the first monocular camera module and the second monocular camera module;
  calculate a second gain for the second pixel signals based on the adjusted first gain, the first exposure value, the difference in sensitivity, and the exposure time;
  acquire, based on the second gain being a negative value, a new exposure time from the second gain and the exposure time;
  set the first gain based on the new exposure time and the first exposure value;
  set, based on the second gain being the negative value, the second gain at zero;
  control exposure of each of the first pixel array and the second pixel array over the new exposure time;
  amplify an output of the first pixel signals by the first gain;
  amplify an output of the second pixel signals by the second gain;
  generate image data from the output of each of the first pixel signals and the second pixel signals; and
  output the generated image data.

9. A capturing system, comprising:
a first monocular camera module;
a second monocular camera module;
a first pixel array in the first monocular camera module, wherein the first pixel array includes first pixels configured to generate first pixel signals;
a second pixel array in the second monocular camera module, wherein the second pixel array includes second pixels configured to generate second pixel signals;
circuitry configured to:
  calculate a first exposure value from the first pixel signals;
  calculate a second exposure value from the second pixel signals;
  set, based on the first exposure value and the second exposure value, an exposure time and a first gain for the first pixel signals;
  adjust the first gain based on a difference in sensitivity between the first monocular camera module and the second monocular camera module;
  calculate a second gain for the second pixel signals based on the adjusted first gain, the first exposure value, the difference in sensitivity, and the exposure time;
  acquire, based on the second gain being a negative value, a new exposure time from the second gain and the exposure time;
  set the first gain based on the new exposure time and the first exposure value;
  set, based on the second gain being the negative value, the second gain at zero;
  control exposure of each of the first pixel array and the second pixel array over the new exposure time;
  amplify an output of the first pixel signals by the first gain; and
  amplify an output of the second pixel signals by the second gain; and
a memory configured to record image data based on the first pixel signals and the second pixel signals.

10. A capturing apparatus control method, comprising:
in a capturing apparatus comprising a first monocular camera module and a second monocular camera module, wherein the first monocular camera module includes a first pixel array and the second monocular camera module includes a second pixel array:
generating, by first pixels of the first pixel array, first pixel signals;
generating, by second pixels of the second pixel array, second pixel signals;
calculating, by circuitry of the capturing apparatus, a first exposure value from the first pixel signals;
calculating, by the circuitry, a second exposure value from the second pixel signals;
setting, by the circuitry, an exposure time and a first gain for the first pixel signals based on the first exposure value and the second exposure value;
adjusting, by the circuitry, the first gain based on a difference in sensitivity between the first monocular camera module and the second monocular camera module;
calculating, by the circuitry, a second gain for the second pixel signals based on the adjusted first gain, the first exposure value, the difference in sensitivity, and the exposure time;
acquiring, by the circuitry based on the second gain being a negative value, a new exposure time from the second gain and the exposure time;
setting, by the circuitry, the first gain based on the new exposure time and the first exposure value;
setting, by the circuitry, the second gain at zero based on the second gain being the negative value;
controlling, by the circuitry, exposure of each of the first pixel array and the second pixel array over the new exposure time; and
amplifying, by the circuitry, an output of the first pixel signals by the first gain; and
amplifying, by the circuitry, an output of the second pixel signals, by the second gain.

* * * * *